(12) United States Patent
Awadin et al.

(10) Patent No.: US 12,425,089 B2
(45) Date of Patent: Sep. 23, 2025

(54) INFORMATION SHARING FOR BEAM MANAGEMENT IN REPEATER

(71) Applicant: Samsung Electronics Co., Ltd., Gyeonggi-do (KR)

(72) Inventors: Mohamed Mokhtar Gaber Moursi Awadin, San Diego, CA (US); Jung Hyun Bae, San Diego, CA (US)

(73) Assignee: Samsung Electronics Co., Ltd. (KR)

( * ) Notice: Subject to any disclaimer, the term of this patent is extended or adjusted under 35 U.S.C. 154(b) by 79 days.

(21) Appl. No.: 18/110,178

(22) Filed: Feb. 15, 2023

(65) Prior Publication Data

US 2023/0327735 A1  Oct. 12, 2023

Related U.S. Application Data

(60) Provisional application No. 63/444,698, filed on Feb. 10, 2023, provisional application No. 63/392,922, filed on Jul. 28, 2022, provisional application No. 63/329,724, filed on Apr. 11, 2022.

(51) Int. Cl.
| | |
|---|---|
| *H04B 7/06* | (2006.01) |
| *H04B 7/08* | (2006.01) |
| *H04W 72/0446* | (2023.01) |
| *H04W 72/1273* | (2023.01) |
| *H04W 72/231* | (2023.01) |
| *H04W 72/232* | (2023.01) |

(52) U.S. Cl.
CPC .......... *H04B 7/0695* (2013.01); *H04B 7/088* (2013.01); *H04W 72/0446* (2013.01); *H04W 72/1273* (2013.01); *H04W 72/231* (2023.01); *H04W 72/232* (2023.01)

(58) Field of Classification Search
CPC .............. H04B 7/0695; H04B 7/06952; H04B 7/06966; H04B 7/088; H04B 7/15528; H04B 7/15542; H04W 72/0446; H04W 72/046; H04W 72/1273; H04W 72/231; H04W 72/232; H04W 84/047
USPC ............... 375/211, 259, 260, 262, 265, 267; 370/315, 321, 326, 330, 337, 347; 455/7, 455/11.1
See application file for complete search history.

(56) References Cited

U.S. PATENT DOCUMENTS

| | | | |
|---|---|---|---|
| 10,277,858 B2 | 4/2019 | Kankaanpää et al. | |
| 10,587,041 B2 | 3/2020 | Shih et al. | |
| 11,223,411 B2 | 1/2022 | Abedini et al. | |
| 2002/0133657 A1 | 9/2002 | Quan et al. | |
| 2015/0231959 A1 | 8/2015 | Ishikawa et al. | |
| 2019/0045494 A1* | 2/2019 | Ho | H04W 76/27 |
| 2021/0159966 A1* | 5/2021 | Xi | H04B 7/0695 |

(Continued)

OTHER PUBLICATIONS

European Search Report dated Aug. 28, 2023 issued in counterpart application No. 23164710.8-1206, 11 pages.

(Continued)

*Primary Examiner* — Young T. Tse
(74) *Attorney, Agent, or Firm* — The Farrell Law Firm, P.C.

(57) ABSTRACT

Disclosed is a method of determining an access link beam by a repeater, including receiving, from a base station, an indication of beam indices including an indicated beam and a corresponding time to apply the indicated beam and transmitting at least one resource set using the indicated beam.

10 Claims, 20 Drawing Sheets

(56) References Cited

U.S. PATENT DOCUMENTS

| | | | | |
|---|---|---|---|---|
| 2021/0298069 A1* | 9/2021 | Abedini | ............ | H04W 74/0833 |
| 2022/0053433 A1 | 2/2022 | Abedini et al. | | |
| 2022/0053486 A1* | 2/2022 | Abedini | ............. | H04B 7/15542 |
| 2022/0124807 A1* | 4/2022 | Hu | ....................... | H04W 74/006 |
| 2022/0140880 A1* | 5/2022 | Cha | ..................... | H04B 7/0695 |
| | | | | 375/262 |
| 2022/0174509 A1* | 6/2022 | Noh | ...................... | H04L 5/0048 |
| 2023/0319918 A1* | 10/2023 | Dutta | ................. | H04W 72/046 |
| | | | | 370/329 |

OTHER PUBLICATIONS

ETSI TS 138 331 V16.7.0 (Jan. 2022) Technical Specification, 5G; NR; Radio Resource Control (RRC); Protocol specification (3GPP TS 38.331 version 16.7.0 Release 16) pp. 950.

3GPP TS 38.214 V17.0.0 (Dec. 2021) Technical Specification, 3rd Generation Partnership Project; Technical Specification Group Radio Access Network.

ZTE Corporation, "New SI: Study on NR Network-controlled Repeaters", 3GPP TSG RAN Meeting #94e RP-213700 Electronic Meeting, Dec. 6-17, 2021, pp. 4.

* cited by examiner

| | | | |
|---|---|---|---|
| R | R | CSI-RS #1 | Oct 1 |
| R | R | CSI-RS #2 | Oct 2 |
| R | R | CSI-RS #3 | Oct 3 |
| R | R | CSI-RS #4 | Oct 4 |
| R | R | CSI-RS #4 | Oct 5 |

Repeated twice because it is associated with two actual beams on the repeater-UE link

...

| | | |
|---|---|---|
| R | Beam index for CSI-RS #1 | Oct N |
| R | Beam index for CSI-RS #2 | Oct N+1 |
| R | Beam index for CSI-RS #3 | Oct N+2 |
| R | Beam index for CSI-RS #4 | Oct N+3 |
| R | Beam index for CSI-RS #4 | Oct N+4 |

INFORMATION SHARING FOR BEAM MANAGEMENT IN REPEATER

CROSS-REFERENCE TO RELATED APPLICATIONS

This application claims the priority benefit under 35 U.S.C. § 119(e) of U.S. Provisional Application Nos. 63/329,724, 63/392,922, and 63/444,698, filed on Apr. 11, 2022, Jul. 28, 2022, and Feb. 10, 2023, respectively, the disclosures of which are incorporated by reference in their entireties as if fully set forth herein.

TECHNICAL FIELD

The disclosure generally relates to wireless communication systems. More particularly, the subject matter disclosed herein relates to improvements to beam management in a repeater in wireless communication systems.

SUMMARY

In legacy new radio (NR), the downlink (DL) beam management can be realized in three steps, which are commonly known as P1, P2, and P3, although such labeling is not used in the specifications.

Coarse beam training occurs in a P1 procedure, which is generally an initial access phase in which a next generation NodeB (gNB) sweeps a synchronization signal block (SSB) burst set and based on the selected SSB, a user equipment (UE) transmits a physical random access channel (PRACH) using the preamble/occasion associated with the selected SSB. Once the gNB receives the transmitted PRACH, the gNB knows the preferred beam to be used in the subsequent DL transmissions.

In a P2 procedure, once the UE is in a radio resource control (RRC) connected state, the gNB can further fine tune the DL beams. In this step, the gNB transmits multiple narrow beams, which the UEs use to report their quality, by reporting L1-reference signal received power (RSRP) for the best beam and differential RSRP of other beams relative to the best beam. Once the gNB receives the transmitted reports from the UE, the gNB can infer the preferred DL beam at the UE.

In a P3 procedure, the gNB allows a UE to fine tune its receiving beam. This is realized by transmitting multiple channel state information-reference signals (CSI-RSs) with the same DL beam such that the UE can assess the quality of different received beams. No reporting is required from the UE in this instance.

FIG. 1 illustrates beam management 100 in the described P1 (101), P2 (102) and P3 (103) procedures according to the prior art. It is expected that the gNB 105 performs the P2 procedure 102 based on the selected beam in the P1 procedure 101. Specifically, narrow beams within the selected SSB are transmitted in the P2 procedure 102.

In the P1 procedure 101 in FIG. 1, the UE 110 transmits a PRACH 120 associated with SSB #1 125. Then CSI-RS #0 130, CSI-RS #1 135, and CSI-RS #2 140, which are narrow beams associated with SSB #1 125, are transmitted as part of the P2 procedure.

Based on the reported L1-RSRP 126, the reasonable gNB 105 behavior is to use one of the good reported beams to transmit another CSI-RSs using the same downlink spatial domain transmission filter. In FIG. 1, the UE 110 reports CSI-RS #0 130 during P2 procedure 102. Therefore, in the P3 procedure 103, the same downlink spatial domain transmission filter is applied for CSI-RS 3-6 which may be the same as the one corresponding to CSI-RS #0 130. Although the specifications do not explicitly mention P1, the UE 110 implicitly understands this as being part of the initial access procedure. The other two procedures are not explicitly referred to as P2 and P3. Instead, the gNB 105 implicitly indicates these procedures by using RRC parameter repetition in a non-zero power (NZP)-CSI-RS-ResourceSet information element (IE).

Specifically, for a particular NZP-CSI-RS-ResourceSet, if repetition is set to off and the reporting quantity associated with this NZP-CSI-RS-ResourceSet is L1-RSRP 126, the UE 110 may assume that this set of CSI-RS is used for the P2 procedure 102. In other words, the UE 110 may not assume that the same beam is used for CSI-RSs belonging to this NZP-CSI-RS-ResourceSet, with repetition set to off.

However, if repetition is set to ON and the reporting quantity associated with the NZP-CSI-RS-ResourceSet is none, the UE 110 may assume that this set of CSI-RS is used for the P3 procedure 103. In other words, the UE 110 may assume that the same beam is used for all CSI-RSs belonging to the NZP-CSI-RS-ResourceSet, with repetition set to ON.

NR Release 18 (Rel. 18), introduced NR controlled repeaters, which are referred to as smart repeaters. A repeater is designed to solve the problems of insufficient coverage and exorbitant cost. Compared with a regular gNB or an integrated access and backhaul (IAB), the repeater typically does not have a full-stack cell, which can significantly reduce the repeater's cost.

FIG. 2 illustrates a network-controlled repeater 200, to which the disclosure is applied. That is, although any suitable repeater could be applied to the present application, the network-controlled repeater 200 will now be described.

In FIG. 2, the network-controlled repeater 200, or smart repeater as disclosed herein, includes the network-controlled mobile terminal (NCR-MT) component 201 and NCR-forwarding (NCR-Fwd) component 202. The NCR-MT 201 communicates with a gNB 205 via a control link (C-link) 203 to enable exchange of side control information at least for the control of NCR-Fwd 202. The C-link 203 is based on the NR Uu interface. The NCR-Fwd 202 amplifies and-forwards a UL/DL RF signal between the gNB 205 and UE 210 via a backhaul link 204 and access link 206. The behavior of the NCR-Fwd 202 is controlled based on the received side control information from the gNB 205. It is noted that the NCR-MT 201 is similar to a conventional mobile terminal, from the standpoint that the NCR-MT 201 includes a memory and a processor in the manner of such a mobile terminal.

One enhancement for a smart repeater involves increasing the spatial beamforming on the repeater-UE link, while maintaining the transparency of the repeater to UEs.

Smart repeaters or reconfigurable intelligence surfaces (RIS) may be deployed to enhance the coverage without the need to implement an expensive gNB or IAB node. Smart repeaters or RIS may amplify-and-forward or reflect, respectively, the received signal/channel from gNB-repeater link to a particular direction that may differ from the direction of the received signal/channel. To minimize cost, the smart repeaters and RIS are expected to be fully controlled by a gNB or IAB node and may be transparently deployed to minimize the UE impacts. Herein, smart repeaters and RIS are used interchangeably.

As to beam training (P1, P2 and P3), a repeater may construct its own beam depending on the area to be covered. Therefore, new procedures should be developed for beam training assuming that the repeater may construct its own beam but cannot generate its own reference signals/channels. For example, in P1 and P2 procedures, the repeater may receive only one beam for DL RS from the gNB and must use this beam to perform beam training according to the P1 and P2 procedures. In legacy NR, P1 and P2 procedures are performed using different RS IDs such that the UE can report the measured quality of each beam, e.g., reporting L1-RSRP 126. Therefore, some enhancements may also be needed to address this issue.

In the P3 procedure, a UE assumes that RSs are transmitted with the same DL beam such that the UE can train its own receive beam. Therefore, when a repeater amplifies-and-forwards such signals, it should maintain such properties to avoid negatively impacting the UE.

As to beam failure recovery, a gNB in legacy NR is aware of the configured candidate beams list and its associated RACH resources, e.g., RACH occasions (ROs) or preamble identifiers (IDs), which the gNB monitors to receive any potential transmitted beam failure recovery request (BFRQ). Therefore, the repeater should be aware of the RACH resources that should be monitored and the corresponding candidate beams based on the repeater beamforming.

An issue with the above approach concerns physical downlink shared channel (PDSCH)/physical uplink shared channel (PUSCH) scheduling. That is, since the repeater may construct its own beam but cannot generate its own reference signals/channels, when a gNB attempts to schedule DL or uplink (UL), the repeater should be aware of which beam should be used for the transmission or reception. For example, in legacy NR, a transmission configuration indicator (TCI) field in the scheduling downlink control information (DCI) can indicate the DL beam for the corresponding PDSCH, such that the UE can adjust its received beam. The repeater in the above approach is unaware of such information to properly forward a PDSCH.

Similarly, for a PUSCH, the repeater is unaware of the receive beam that should be applied. Therefore, there is a need in the art for some enhancements to address this lack of awareness issue and to apprise the repeater of the beams to be used for transmission or reception of different DL or UL signals and channels to improve beam transmission and reception and facilitate more efficient wireless transmissions.

The same need applies for a physical downlink control channel (PDCCH)/physical uplink control channel (PUCCH). Specifically, the repeater should be aware of which beams should be used to transmit a PDCCH or receive a PUCCH.

An aspect of the disclosure is to provide a smart repeater that can be equally applied to reconfigurable intelligence surfaces.

An aspect of the disclosure is to provide solutions in the P2 procedure for conducting beam management when a repeater is deployed by mapping the CSI-RS transmitted on the gNB-repeater link to actual beams on the repeater-UE link, to providing signaling enabling the gNB to signal the time domain location of CSI-RSs used for a P2 procedure and enabling the repeater to inform the gNB of CSI-RSs mapping to beams on the repeater-UE link.

The above approaches improve on previous methods by enabling the repeater to freely select the beams used for forwarding the CSI-RSs.

An aspect of the disclosure is to provide solutions in the P3 procedure for a gNB to inform the repeater of which CSI-RSs are to be used and developing a framework apprising the repeater of the configurations of the UEs served by the repeater.

The above approaches improve on previous methods by informing the repeater of the actual beam to be applied for transmission or reception of DL or UL signals.

An aspect of the disclosure is to provide the repeater with time domain information of the symbols occupied by different channels, e.g., PDSCH, PDCCH, PUSCH, or PUCCH, with reduced signaling overhead and to provide procedures for a gNB to indicate which beam should be applied for different channels.

An aspect of the disclosure is to provide prioritization rules to be applied to determine which beam the repeater should use on the repeater-UE link when there is a conflict regarding the indicated beam at a particular symbol.

An aspect of the disclosure is to provide rules for a UE to determine a default beam to be applied when no other indication is provided from the gNB.

An aspect of the disclosure is to provide solutions for an RS used for beam failure detection or candidate beam identification.

In an embodiment, a method of determining an access link beam by a repeater includes receiving, from a base station, an indication of beam indices including an indicated beam and a corresponding time to apply the indicated beam and transmitting at least one resource set using the indicated beam.

In an embodiment, a method of a repeater includes receiving a downlink transmission from a base station, selecting the backhaul beam from a same transmission configuration indicator (TCI) state pool used for a backhaul link between the base station and a forwarding unit of the repeater, and forwarding the downlink transmission to a UE.

In an embodiment, an apparatus includes at least one processor, and at least one memory operatively connected with the at least one processor, the at least one memory storing instructions, which when executed, instruct the at least one processor to perform a method of a repeater by receiving a downlink transmission from a base station, selecting a backhaul beam from a same TCI state pool used for a backhaul link between the base station and a forwarding unit of the repeater, and forwarding the downlink transmission to a UE.

BRIEF DESCRIPTION OF THE DRAWINGS

In the following section, the aspects of the subject matter disclosed herein will be described with reference to exemplary embodiments illustrated in the figures, in which:

FIG. 11 illustrates a medium access control-control element (MAC-CE) indicating a mapping 1100 of CSI-RS on the gNB-repeater link to the actual beam on the repeater-UE link, according to an embodiment;

DETAILED DESCRIPTION

Figure 1:
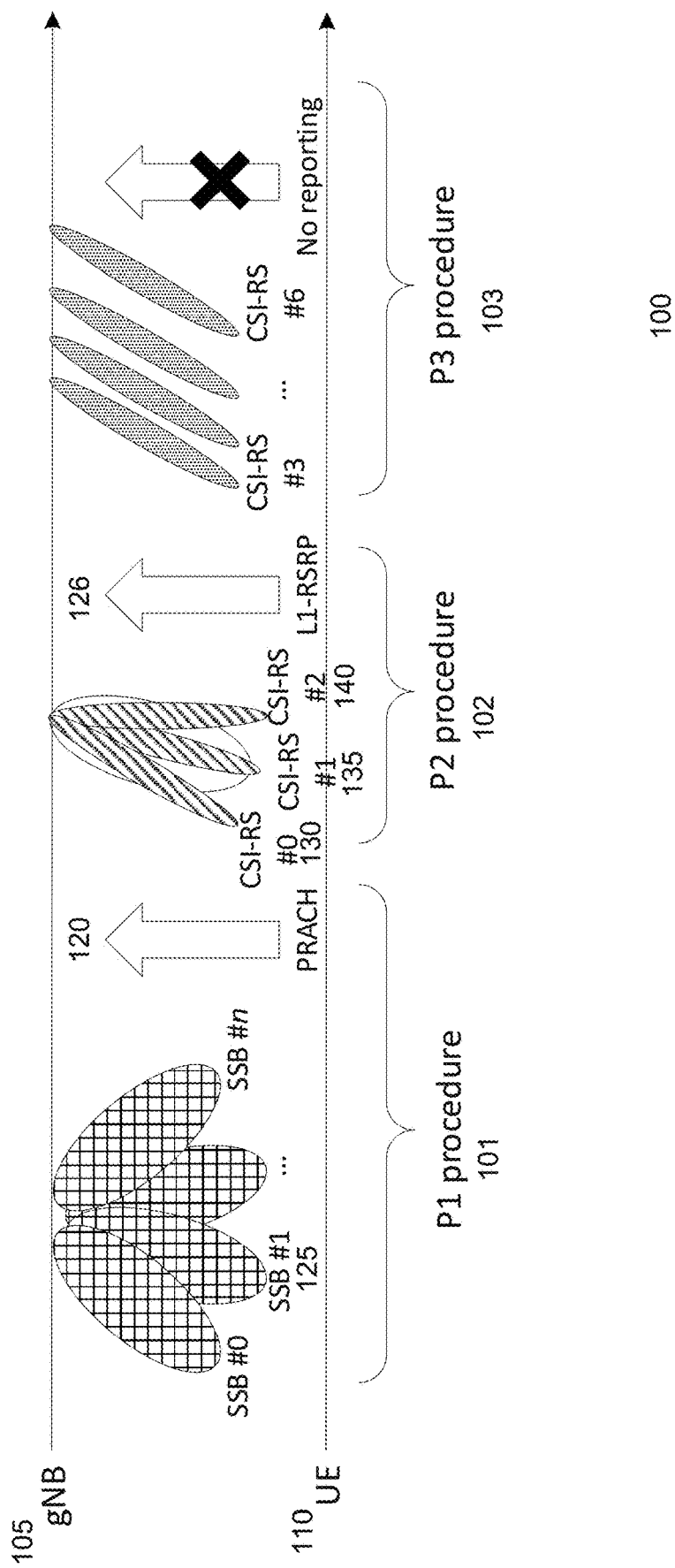
FIG. 1 illustrates beam management 100 in the described P1, P2 and P3 procedures according to the prior art.

In the following detailed description, numerous specific details are set forth to provide a thorough understanding of the disclosure. It will be understood, however, by those skilled in the art that the disclosed aspects may be practiced without these specific details. In other instances, well-known methods, procedures, components and circuits have not been described in detail to not obscure the subject matter disclosed herein.

Reference throughout this specification to "one embodiment" or "an embodiment" means that a particular feature, structure, or characteristic described in connection with the embodiment may be included in at least one embodiment disclosed herein. Thus, the appearances of the phrases "in one embodiment" or "in an embodiment" or "according to one embodiment" (or other phrases having similar import) in various places throughout this specification may not necessarily all be referring to the same embodiment. Furthermore, the particular features, structures or characteristics may be combined in any suitable manner in one or more embodiments. In this regard, as used herein, the word "exemplary" means "serving as an example, instance, or illustration." Any embodiment described herein as "exemplary" is not to be construed as necessarily preferred or advantageous over other embodiments.

Additionally, the particular features, structures, or characteristics may be combined in any suitable manner in one or more embodiments. Also, depending on the context of discussion herein, a singular term may include the corresponding plural forms and a plural term may include the corresponding singular form. Similarly, a hyphenated term (e.g., "two-dimensional," "predetermined," "pixel-specific," etc.) may be occasionally interchangeably used with a corresponding non-hyphenated version (e.g., "two dimensional," "predetermined," "pixel specific," etc.), and a capitalized entry (e.g., "Counter Clock," "Row Select," "PIXOUT," etc.) may be interchangeably used with a corresponding non-capitalized version (e.g., "counter clock," "row select," "pixout," etc.). Such occasional interchangeable uses shall not be considered inconsistent with each other.

Also, depending on the context of discussion herein, a singular term may include the corresponding plural forms and a plural term may include the corresponding singular form. It is further noted that various figures (including component diagrams) shown and discussed herein are for illustrative purpose only and are not drawn to scale. For example, the dimensions of some of the elements may be exaggerated relative to other elements for clarity. Further, if considered appropriate, reference numerals have been repeated among the figures to indicate corresponding and/or analogous elements.

The terminology used herein is for the purpose of describing some example embodiments only and is not intended to be limiting of the claimed subject matter. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that when an element or layer is referred to as being on, "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numerals refer to like elements throughout. As used herein, the term "and/or" includes any and all combinations of one or more of the associated listed items.

The terms "first," "second," etc., as used herein, are used as labels for nouns that they precede, and do not imply any type of ordering (e.g., spatial, temporal, logical, etc.) unless explicitly defined as such. Furthermore, the same reference numerals may be used across two or more figures to refer to parts, components, blocks, circuits, units, or modules having the same or similar functionality. Such usage is, however, for simplicity of illustration and ease of discussion only; it does not imply that the construction or architectural details of such components or units are the same across all embodiments or such commonly referenced parts/modules are the only way to implement some of the example embodiments disclosed herein.

Unless otherwise defined, all terms (including technical and scientific terms) used herein have the same meaning as commonly understood by one of ordinary skill in the art to which this subject matter belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As used herein, the term "module" refers to any combination of software, firmware and/or hardware configured to provide the functionality described herein in connection with a module. For example, software may be embodied as a software package, code and/or instruction set or instructions, and the term "hardware," as used in any implementation described herein, may include, for example, singularly or in any combination, an assembly, hardwired circuitry, programmable circuitry, state machine circuitry, and/or firmware that stores instructions executed by programmable circuitry. The modules may, collectively or individually, be embodied as circuitry that forms part of a larger system, for example, but not limited to, an integrated circuit (IC), system on-a-chip (SoC), an assembly, and so forth.

Beam Training

Although embodiments of the disclosure are described with reference to particular beam management procedures (i.e., P1, P2, or P3), they may be equally applied to other procedures. For example, the procedure described for P2 may equally be applied to P1 and procedure for forwarding CSI-RS used for P2 may be equally applied and extended to forward SSBs used in P1.

In legacy NR, for transmit beam refining at a gNB side, a P2 procedure may be used for transmitting finer DL beam to a UE, which in turn reports the measured L1-RSRP and the corresponding CSI-RS index. Using the RRC parameter repetition in an NZP-CSI-RS-ResourceSet IE, the gNB can indicate whether the P2 procedure is applied. Specifically, if repetition is set to off, the UE may not assume that the NZP-CSI-RS resources within the resource set are transmitted with the same downlink beam. In other words, different DL beams can be applied for different CSI-RSs in the same NZP-CSI-RS-ResourceSet.

Repeater is Unaware of the CSI-RS Configurations for its UEs

To simplify the repeater implementation, the repeater may not be required to decode the CSI-RS configurations for each UE served by the repeater or to decode the triggering DCI for aperiodic CSI-RS or the (de)activation MAC-CE for semi-persistent CSI-RS. This may be beneficial when the repeater is serving many UEs and imposing such requirements on the repeater, i.e., being aware of CSI-RS information of each UE, may result in a more complicated repeater with higher cost.

To this end, the gNB may indicate to the repeater when the received signals/channels on the gNB-repeater link can be used for beam sweeping purpose on the repeater-UE link. In this case, it is unnecessary for the repeater to be aware of CSI-RS configurations for different UEs served by the repeater. Instead, the repeater should be aware of when it can freely use such signals/channels for P2 procedure. However, a UE still receives the configuration/activation/triggering of a CSI-RS according to legacy procedures but remains unaware of the repeater's presence.

Figure 3:
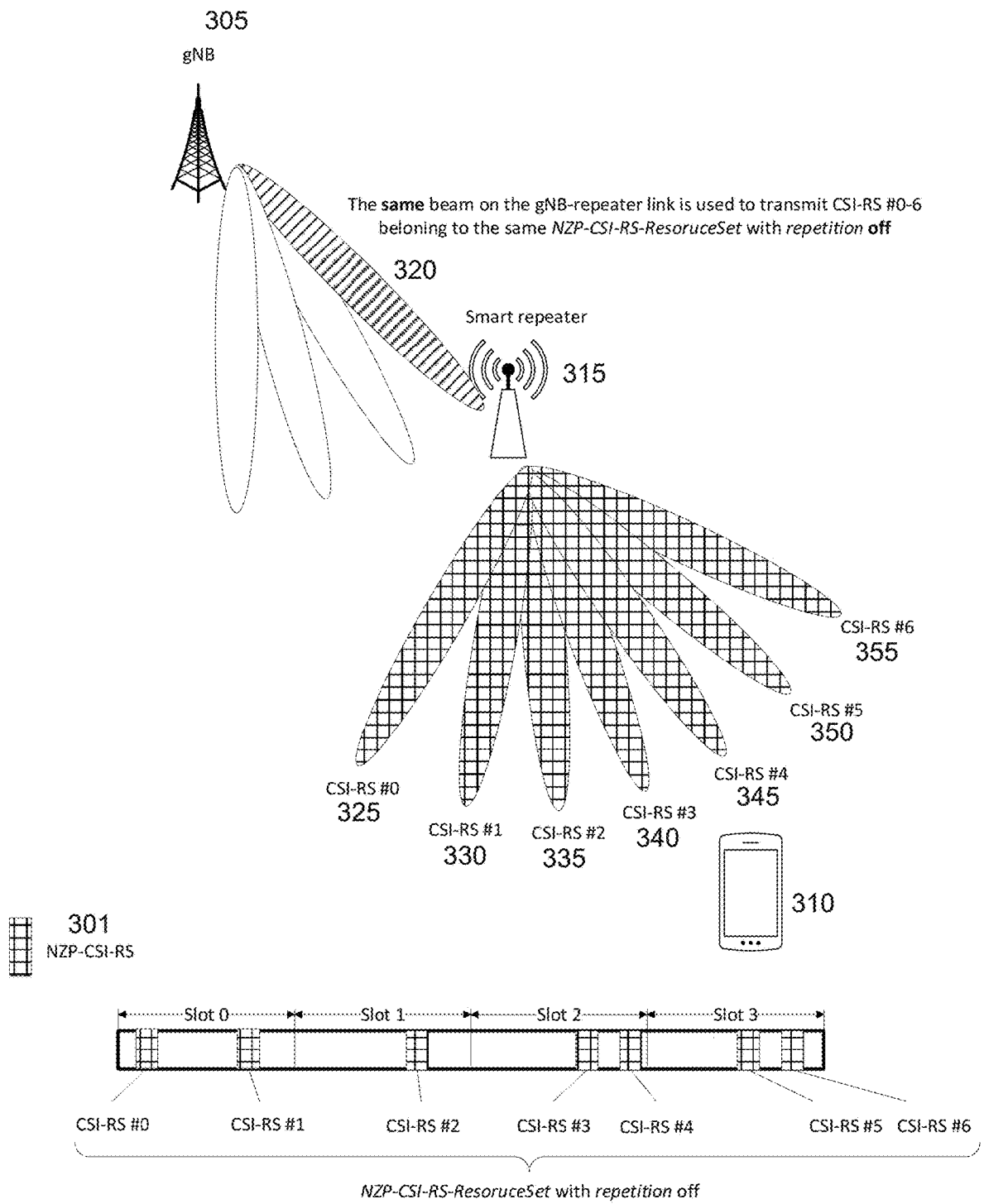
FIG. 3 illustrates an example 300 of an NZP-CSI-RS-ResourceSet provided to a UE with repetition set to off, according to an embodiment.

FIG. 3 illustrates an example 300 of an NZP-CSI-RS-ResourceSet 301 provided to a UE 310 with repetition set to off, according to an embodiment. In FIG. 3, the UE 310 expects that different transmission (Tx) beams are used to transmit CSI-RSs belonging to that NZP-CSI-RS-ResourceSet 301. Using the disclosed indicator(s) in this disclosure from the gNB 305 to the repeater 315, the repeater 315 becomes aware of how to sweep the transmit beam on the repeater 315-UE 310 link.

Specifically, the NZP-CSI-RS-ResourceSet 301 includes CSI-RS #0-6 325, 330, 335, 340, 345, 350, 355 with repetition set to off. Although the repeater 315 receivers all CSI-RSs using the same beam 320 on the gNB 305-repeater 315 link, the repeater 315 applies different transmit beams for different CSI-RSs to effectively have the same functionality of a legacy P2 from the UE 310 perspective. As will be described below in more detail, the indication(s) from the gNB 305 to the repeater 315 may carry information to inform the repeater 315 about the location of different CSI-RSs where different transmissions may be applied, and the repeater 315 applies different beams for different CSI-RSs.

Using a similar approach for CSI-RS for P2, a gNB may transmit multiple SSBs on a gNB-repeater link, or the gNB may use multiple beams for transmitting SSBs and the repeater has the capability of receiving them. Thereafter, the repeater may apply different transmit beams for different SSBs to effectively have the same functionality of legacy P1 from the UE perspective and the cover the intended area.

Figure 4:
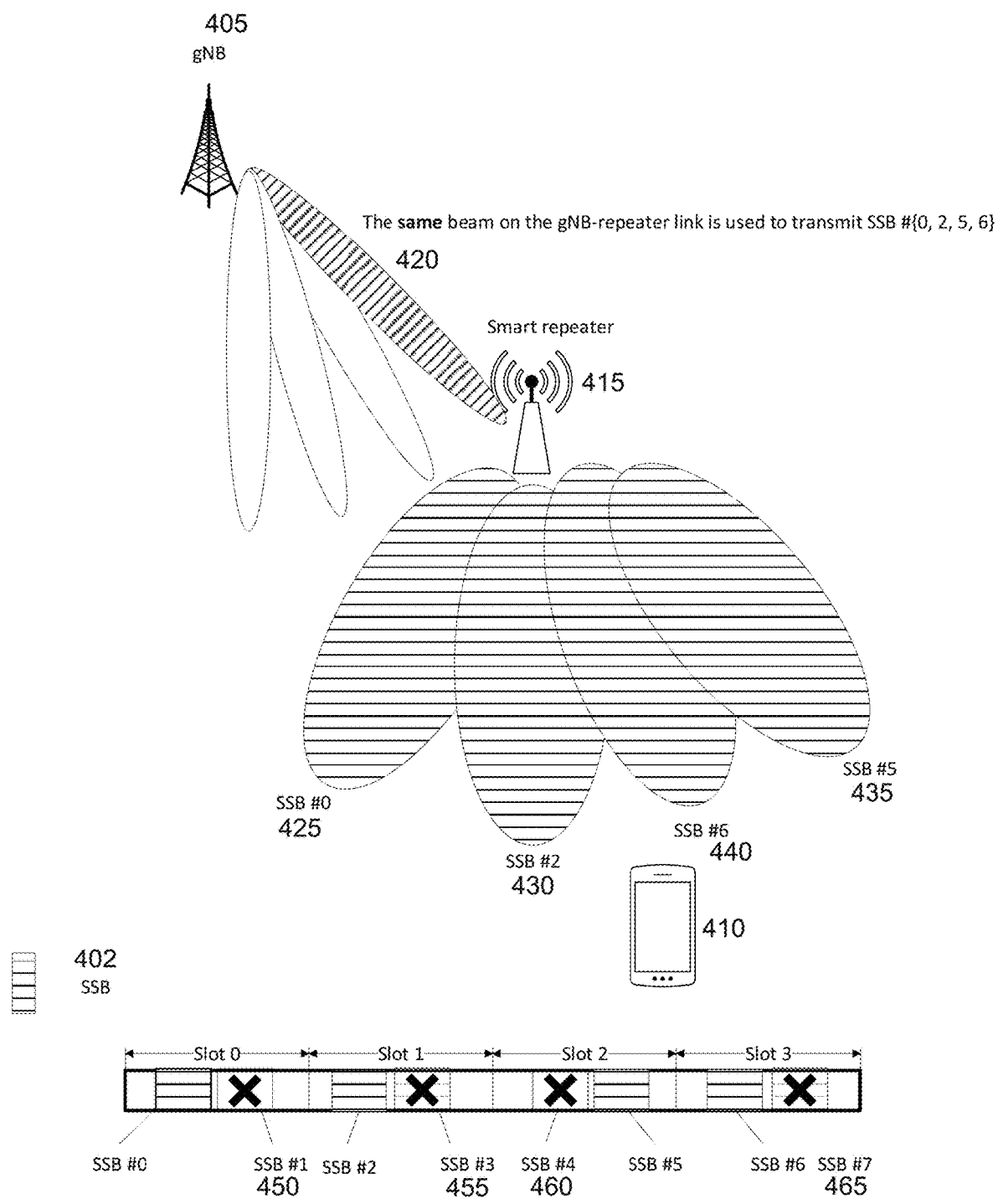
FIG. 4 illustrates an example 400 of SSBs mapping to different beams on the repeater-UE link, according to an embodiment.

FIG. 4 illustrates an example 400 of SSBs mapping to different beams on the repeater-UE link, according to an embodiment. FIG. 4 is similar to FIG. 3 but is with respect to SSB 402.

In FIG. 4, SSB indexes {0, 2, 5, 6} 425, 430, 435, 440 are indicated to be forwarded by the repeater 415. In this case, the repeater 415 amplifies-and-forwards these SSBs for which the repeater 415 forwards using different beams. Since SSBs are assigned to particular locations in the time domain, only the SSBs assigned to the repeater 415 may be forwarded by the repeater 415. The remaining SSBs may not be forwarded, even if they are received by the repeater 415. For example, this is depicted by an X mark in SSBs {1, 3, 4, 7} 450, 455, 460, 465 in FIG. 4.

Associate DL Signals/Channels with Transmit Beams at the Repeater (P2 Procedure)

In a P2 procedure, the repeater can freely construct the actual beams on the repeater-UE link to forward the received RSs for the P2 procedure from the gNB on the gNB-repeater link. There are several possibilities to map these RSs on the gNB-repeater link to actual beams on the repeater-UE link.

Some constraints may be applied depending on how many SSBs are forwarded in P1. For example, if only a single SSB is forwarded by the repeater, the beams for the RSs used in P2 can be freely constructed by the repeater. This may be equivalent to forwarding an SSB using an omni or semi-omni beam and then constructing the beams of RS for P2 by the repeater as long as they are within the SSB coverage. If there are multiple SSBs forwarded by the repeater in a P1 procedure, the repeater may construct the beams for RSs used for P2 based on the associated SSB. For example, the repeater may construct narrow beams for CSI-RSs within the coverage of the associated SSB, in which case the RSs used for P2 may be handled in the manner of the P3 procedure in terms of indicating and when to apply indication of the associated beam.

The gNB and the repeater should have a common understanding of how different transmitted RSs from the gNB are mapped to downlink transmit beams at the repeater. That is, the gNB should know which beams and corresponding RSs can be used for scheduling.

One-to-One Mapping

In a one-to-one mapping approach, each RS for beam management is mapped to a single beam DL on the repeater- UE link, e.g., as illustrated in FIGS. 3 and 4, wherein CSI-RS #0-6 325-355 and SSB #{0, 2, 5, 6} 425-440, respectively, are one-to-one mapped to 7 and 4 beams on the repeater-UE link, respectively.

In this case, when the UE reports the measured beam quality, e.g., L1-RSRP, and the corresponding CSI-RS, there will be no ambiguity between the UE and the gNB.

It is signaled, from the repeater to the gNB, whether the repeater supports such mapping, by using repeater capability signaling which is similar to UE capability signaling.

The repeater may also indicate the number of RSs in which one-to-one mapping can be applied. Effectively, the repeater may indicate the number of beams that can be constructed on the repeater-UE link. In addition, the number of RSs with one-to-one mapping to actual beams on the repeater-UE link within particular time frame may be indicated. For example, the repeater may indicate that a maximum of 2 RSs can be mapped to three distinct beams as shown in Slot 3 in FIG. 3.

After an association between the transmitted RSs on the gNB-repeater link and the actual beams on the repeater-UE link, the repeater is not expected to change the association unless instructed by a gNB. This enables the gNB to indicate, to the repeater, which beam should be used for forwarding DL signals/channels, and the gNB can indicate, to the UE, which beam should be used for reception on the repeater-UE link, as a repeater cannot create its own signals/channels.

Since the repeater is unaware of CSI-RS configurations and their purpose, the gNB may provide the repeater with the following information. Specifically, the gNB may indicate that the purpose of forwarded RSs is for beam management. For example, if the P2 procedure is indicated, the repeater may apply distinct beams for each forwarded RS. Table 1 below illustrates the interpretation of the purpose field.

TABLE 1

| Purpose | Interpretation |
| --- | --- |
| 0 | The reference signal is for P2 procedure in beam management |
| 1 | The reference signal is for P3 procedure in beam management |

If the repeater forwards multiple SSBs during the P1 procedure, regarding which beams to be used for forwarding RS for the P2 procedure, the gNB may inform the repeater of the associated beam used in forwarding the SSB in P1. The procedures described herein allowing the gNB to instruct the repeater which beam to use may be applied here. The gNB indicates to the repeater which beam to use similar to the beam indication procedures for the P3 procedure or for forwarding different channels herein. On the other hand, in the P2 procedure, the gNB indicates, to the repeater, the associated beam used for SSB. That is, the repeater is not required to use the same wide beam used for forwarding SSB but may use narrower beams for CSI-RS. However, those narrow beams may be related to the associated wide beam for forwarding SSB, e.g., the narrow beams may have the same spatial direction and QCL type D properties.

In this case, in addition to indicating the associated beam, providing purpose information as in Table 1 is beneficial to assist the repeater to determine whether the indicated beam should be identically applied or the repeater has the freedom to alter that beam while maintaining some of the properties, such as the special direction, e.g., QCL type D.

Figure 5:
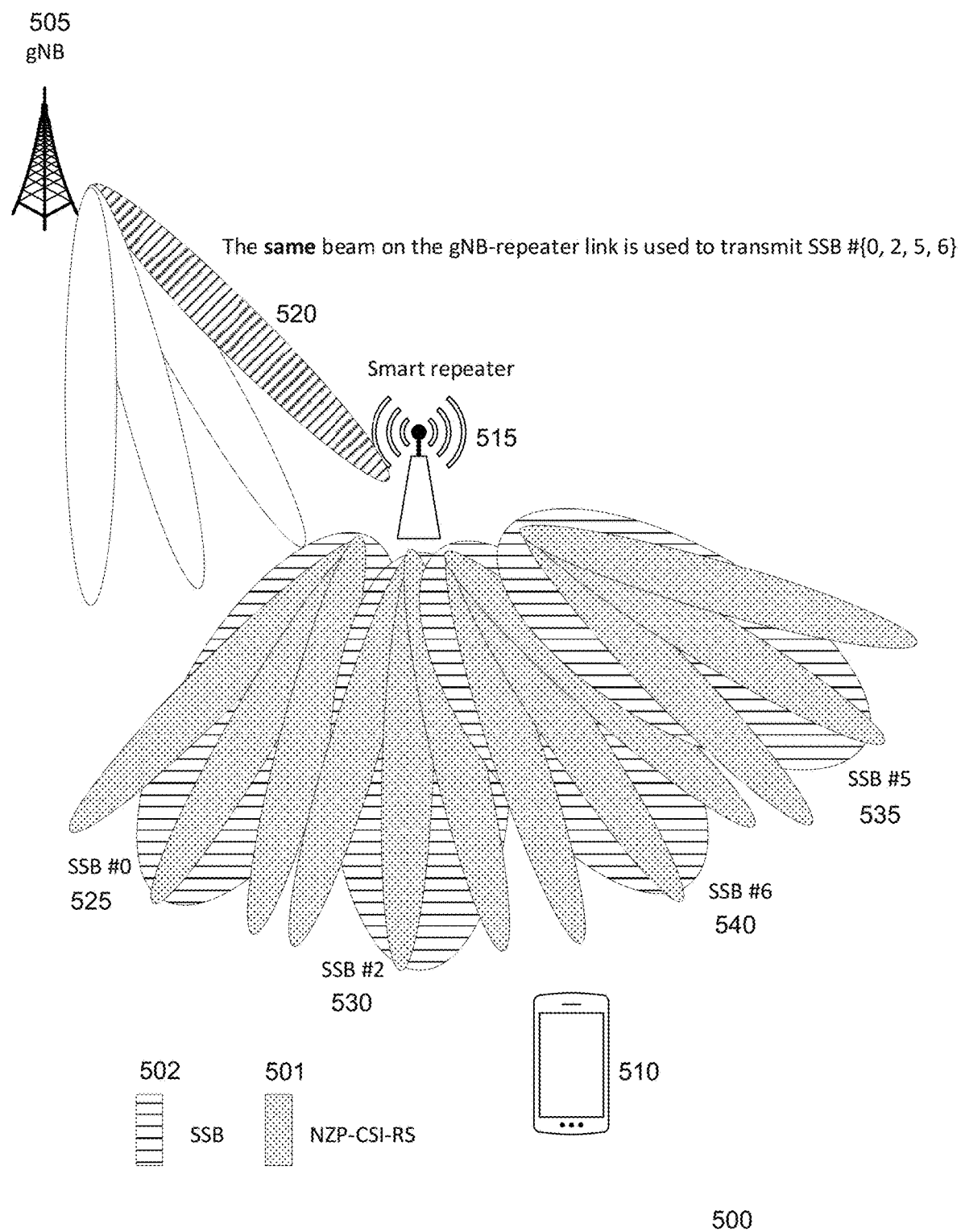
FIG. 5 illustrates an example 500 of indicating a beam used for forwarding an SSB and CSI-RS, according to an embodiment.

The purpose information may be indicated explicitly or implicitly. The implicit indication approach may be realized when the gNB indicates to the repeater the index(ices) of beams for forwarding the transmission. Some of them may be dedicated to indicate that the repeater may freely construct the forwarding beams while possibly keeping some properties the same. For example, if the gNB indicates to the repeater to forward the transmission on the repeater-UE link using a beam from the set of beams used for forwarding SSB, the repeater may infer that narrower beams can be constructed while maintaining some common properties such as the spatial direction. FIG. 5 illustrates an example 500 of indicating a beam used for forwarding an SSB 502 and CSI-RS 501, according to an embodiment. In particular, FIG. 5 illustrates how the repeater 515 forwards 4 SSBs 525, 530, 535, 540 using wide beams on the repeater 515-UE 510 link. The gNB 505 further instructs the repeater 515 to forward a group of CSI-RS 501 associated with each SSB 502 where each group has 3 CSI-RS. For a particular group of CSI-RS 501, the forwarding narrow beam of all CSI-RSs on the repeater 515-UE 510 link is associated with the same wide beam used for forwarding particular SSBs on the repeater 515-UE 510 link. In this case, the repeater 515 constructs different narrow beams for each CSI-RS 501, but these narrow beams have common properties with the associated wide beam such as the special direction. In other words, the repeater 515 forwards these CSI-RSs 501 such that the wide beam for forwarding the associated SSB 502 represents source RS for QCL-type D from the perspective of the UE 510.

For the time domain information, the gNB may indicate to the repeater which symbols/slots/subframes carrying the RSs for a P2 procedure are used in beam management. The gNB may indicate, to the repeater, the starting symbol and number of symbols of each RS used for beam management. For example, multiple start and length indicator values (SLIVs) can be indicated to point to the location of RSs within one slot.

Since CSI-RS for beam management is either a single port or two ports, according to CSI-RS configurations, CSI-RS will occupy only one orthogonal frequency domain multiplexing (OFDM) symbol. In this case, a bitmap may be used to indicate location of CSI-RS for beam management. The length of bitmap may be 14 bits covering one slot or more than 14 covering multiple consecutive slots until the next occasion to transmit the indicator. Each bit may correspond to one or multiple symbols and the granularity of each bit in the bitmap may be indicated to the repeater or predefined in the specifications.

At least for cell-defining SSBs, the purpose information may not be indicated because the repeater should be able to detect the SSBs from the gNB, similar to a typical UE. The repeater may freely determine the forwarding beams on the repeater-UE link based on the area intended to be covered. Also, the repeater should be able to determine the time domain position of the SSB similar to a typical UE. Therefore, the gNB may not need to determine the time domain of SSBs and may not need to instruct the repeater to forward the SSB each time to reduce the signaling overhead.

The gNB may indicate which SSBs from the set of SSBs received by repeater are to be forwarded by the repeater. When the repeater receives those SSBs, the repeater forwards them and determine the forwarding beam. However, for the same SSB index across a different SSB burst set, the repeater is expected to use the same beam.

For example, the repeater forwards all received SSBs and determines used beam based on the coverage area. Alternatively, the gNB may indicate which set of SSBs can be forwarded by the repeater. The gNB may provide the repeater with a bitmap indicating which SSBs can be forwarded by the repeater. This may be realized by higher layer signaling. For example, an RRC parameter similar to ssb-PositionsInBurst may be transmitted to the repeater in remaining system information/other system information (RMSI/OSI) and may labeled by ssb-PositionsInBurst-r18. This bitmap may be indicated by higher layer signaling other than RMSI/OSI, such as RRC IE dedicated to the repeater to avoid impacting the RMSI/OSI.

The repeater may forward the SSBs indicated by the gNB whenever the repeater receives the SSBs as described above, and the repeater may also forward the RMSI-PDCCH and RMSI-PDSCH associated with indicated SSBs to be forwarded by the repeater. Similar to SSB, the gNB may not need to instruct the repeater to separately forward each RMSI, and instead, may assume that the RMSI-PDCCH and RMSI-PDSCH associated with the indicated SSB should be forwarded without explicit instruction from the gNB. Moreover, when forwarding the RMSI-PDCCH and RMSI-PDSCH, the repeater may use the same beam as the one used for forwarding the corresponding SSB.

It may also be beneficial for the UE to receive ssb-PositionsInBurst-r18 when it is included in RMSI, for example. In this case, the UE may become aware of the presence of the repeater and may determine that it is being served by the repeater. Specifically, if the SSB ID of the selected SSB by the UE to access the system belongs to ssb-PositionsInBurst-r18, the UE may assume that it is served by the repeater. Otherwise, if the SSB Id of the selected SSB by the UE to access the system belongs to ssb-PositionsInBurst (without suffix), the UE may assume that it is served by the gNB. If the UE is served by the repeater, the UE may assume that RBs spanned by SSB indices in ssb-PositionsInBurst-r18 are unavailable for PDSCH, while the RBs spanned by SSB indices in sb-PositionsInBurst (without suffix) are available for PDSCH. However, if the UE is served by the gNB, the UE may assume that RBs spanned by SSB indices in ssb-PositionsInBurst (without suffix) are unavailable for the PDSCH, while the RBs spanned by SSB indices in ssb-PositionsInBurst-r18 are available for PDSCH.

The UE may expect that the set of SSB indices in PositionsInBurst (without suffix) and ssb-PositionsInBurst-r18 are mutually exclusive.

This indication from the gNB to the repeater may be transmitted as a DCI in a PDCCH with a cyclic redundancy check (CRC) scrambled by a radio network temporary identifier (RNTI) for the repeater. This RNTI can be similar to a cell-radio network temporary identifier (C-RNTI). In this case, the repeater may have at least two RNTIs, where one may be used to scramble DCI carrying the beam information from the gNB to the repeater and the other may be used in a similar manner as a typical UE, such as C-RNTI for receiving dedicated configurations. The legacy approach to configure a search space (SS) set and control resource set (CORESET) for UEs may be applied for the repeater.

Figure 6:
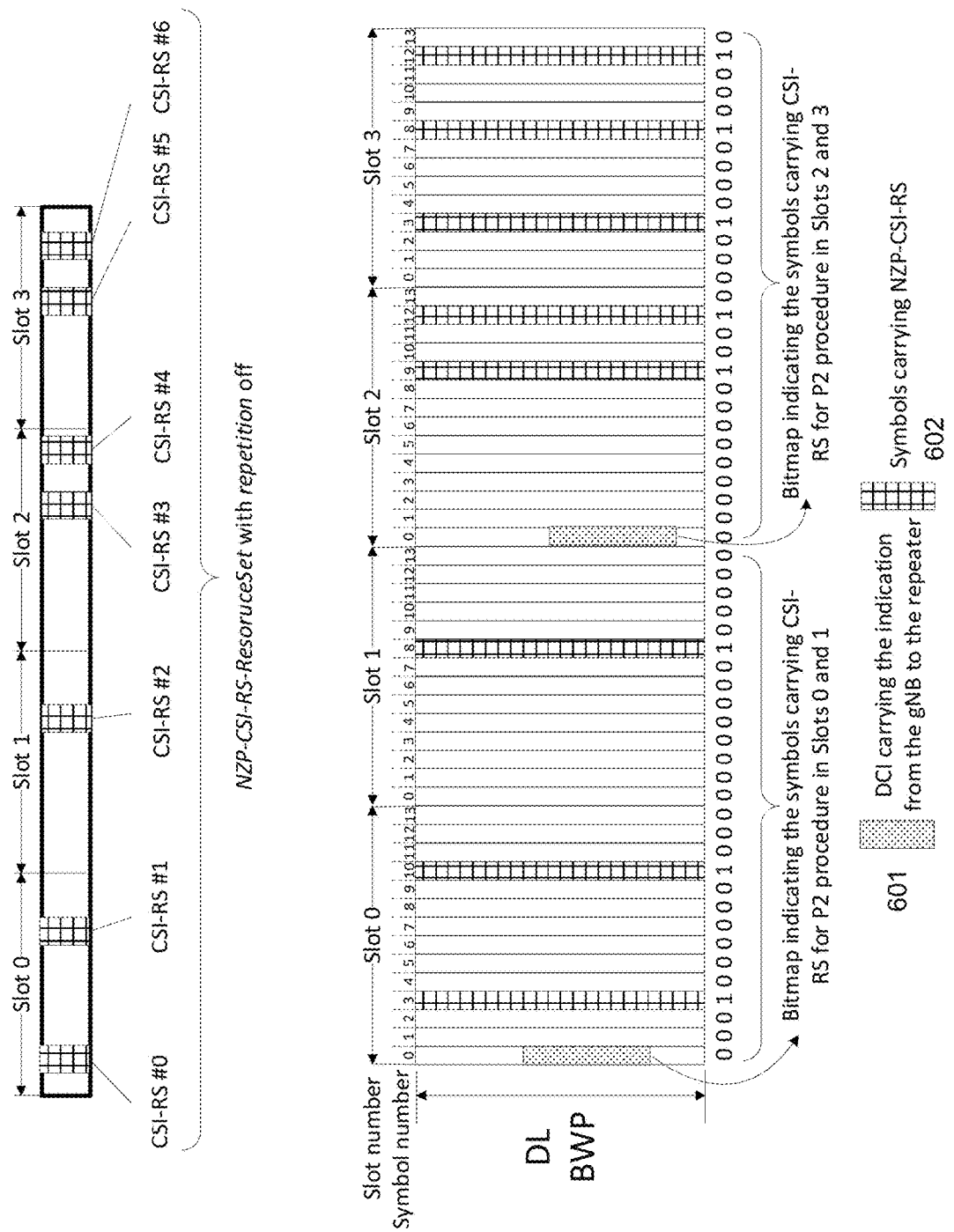
FIG. 6 illustrates a DCI based indication of CSI-RS for the P2 procedure 600, according to an embodiment.

FIG. 6 illustrates a DCI based indication of CSI-RS for the P2 procedure 600, according to an embodiment. In particular, FIG. 6 illustrates a PDCCH from a gNB to the repeater carrying a bitmap indicating a location of a CSI-RS for a P2 procedure. Each indication has 18 bits to indicate the location in two consecutive slots. In this case, the repeater applies distinct beams for each symbol 602 carrying a CSI-RS. Using a PDCCH to carry the indication may be beneficial for quick adjustment of the beams. For example, if the gNB triggered aperiodic CSI-RSs for a P2 procedure, the gNB can use a DCI 601 to inform the repeater with the location of those CSI-RSs, such that the repeater can apply different beams towards the UE.

Although the previous example is explained for CSI-RS, the bitmap indication may be used to indicate the time location of SSBs, such as non-cell-defining SSBs used for different purposes such as for P2 procedure.

The indication from the gNB to the repeater may be transmitted via higher layer signaling, which may also be beneficial in reducing signaling overhead. For example, the gNB may transmit a MAC-CE, to the repeater, indicating the symbols carrying CSI-RSs or SSB. This may be in the form of a bitmap where each bit may correspond to one or multiple symbols/slots and the granularity of each bit in the bitmap may be indicated to the repeater or predefined in the specifications.

Since the indication spans a limited time period where the period may be configured by RRC or indicated by MAC-CE, the indicated pattern of symbols carrying CSI-RSs or SSB may be continuously repeated until another instruction is received, such as modifying or deactivating the pattern. In other words, the provided indication is applied periodically until the deactivation MAC-CE is received. If the RRC configures multiple periods, the MAC-CE can select the period to be applied. The period may be in units of frame, subframe, slots, OFDM symbols, absolute time units such as msec, sec, etc.

Using a MAC-CE to carry the indication may also be beneficial and well suited for semi-persistent CSI-RSs activated by a MAC-CE.

The indication provided from the gNB, to the repeater, by MAC-CE, can be applicable after the repeater transmits a hybrid automatic repeat request acknowledgement (HARQ-Ack) of the MAC-CE. For example, the indication may be applied in the first slot after slot $n+3N_{slot}^{subframe,\mu}$, where n is the slot for the HARQ-Ack of the MAC-CE.

When RRC is used, a particular offset at which the indicator is applied may be signaled through higher layer signaling or predefined based on some rules.

Alternatively, the gNB may use RRC parameter(s) to provide the repeater with the information about the location of a CSI-RS used for a P2 procedure or the location of the SSB. The RRC parameter may be a bitmap where each bit may correspond to one or multiple symbols/slots and the granularity of each bit in the bitmap may be indicated to the repeater or predefined. Since the indication spans a limited time period, the indicated pattern of symbols carrying CSI-RSs or SSB may be continuously repeated until another instruction is received, such as modifying or releasing the pattern. In other words, the provided indication is applied periodically until the release command is received.

Alternatively, another bitmap may be provided to indicate the repetition pattern of the aforementioned bitmap which may continuously repeat itself.

One-to-Many Mapping

Figure 7:
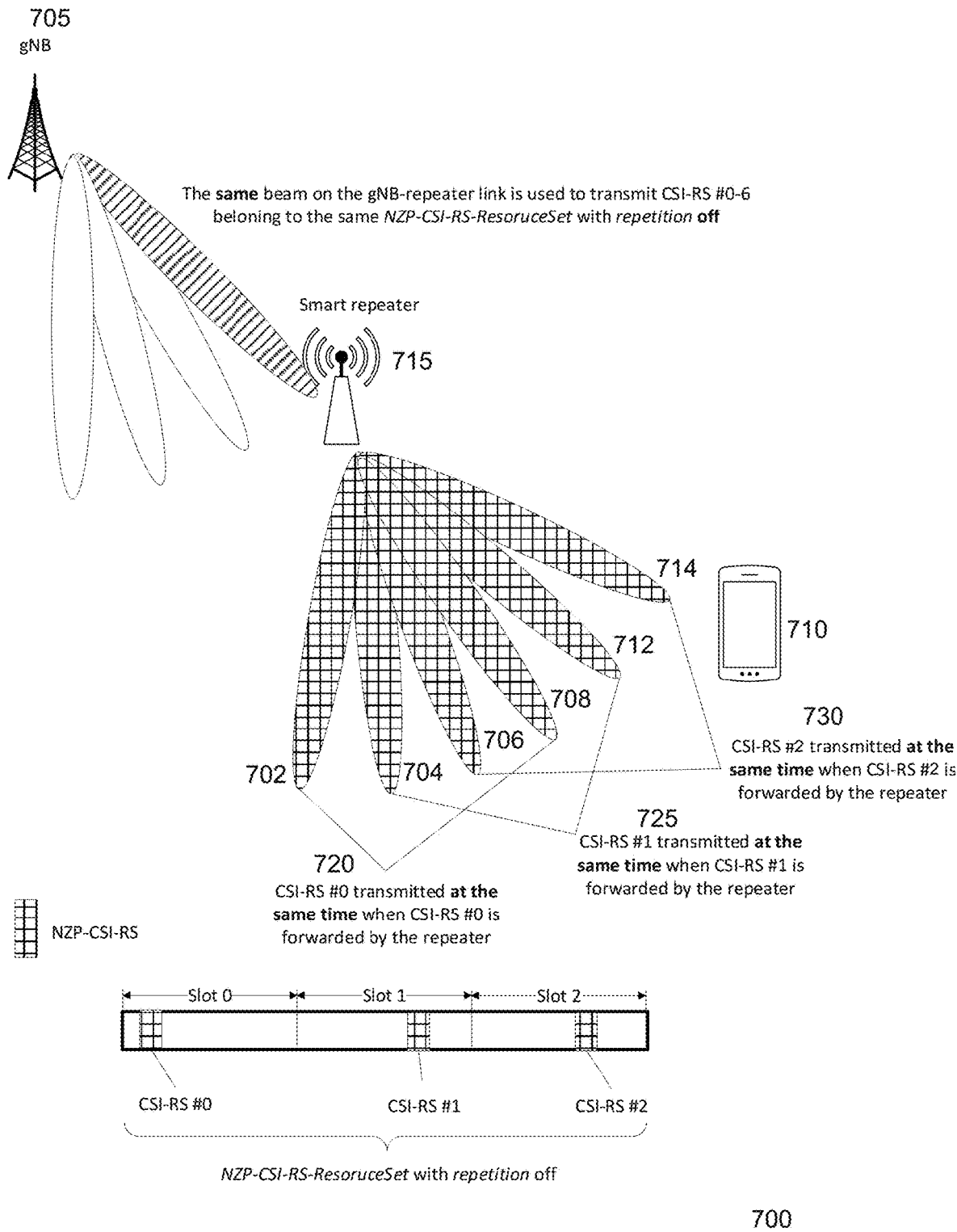
FIG. 7 illustrates mapping 700 of a CSI-RS from a gNB to multiple beams on the repeater-UE link, according to an embodiment.

FIG. 7 illustrates mapping 700 of a CSI-RS from a gNB 705 to multiple beams on the repeater 715-UE 710 link, according to an embodiment. In FIG. 7, a repeater 715 may be able to simultaneously construct multiple beams such as the following beam tuples: (702, 708), (704, 712), (706, 714), in which case, the number of configured CSI-RSs by the gNB 705 may be reduced. The repeater 715 in FIG. 7 forwards each CSI-RS 720, 725, 730 using two distinct beams.

If the beams are spatially separated in a sufficient manner, the UE 710 receives only one version of the same CSI-RS at any time instance. If not, the UE 710 will receive the same CSI-RSs that are transmitted on different beams. This may be irrelevant as the UE 710 may handle this as if the CSI-RSs are received from multiple paths.

The same procedures described in the one-to-one mapping procedure may be extended for a one-to-many procedure for indicating the repeater capability, the purpose of CSI-RS, their locations, etc.

Figure 8:
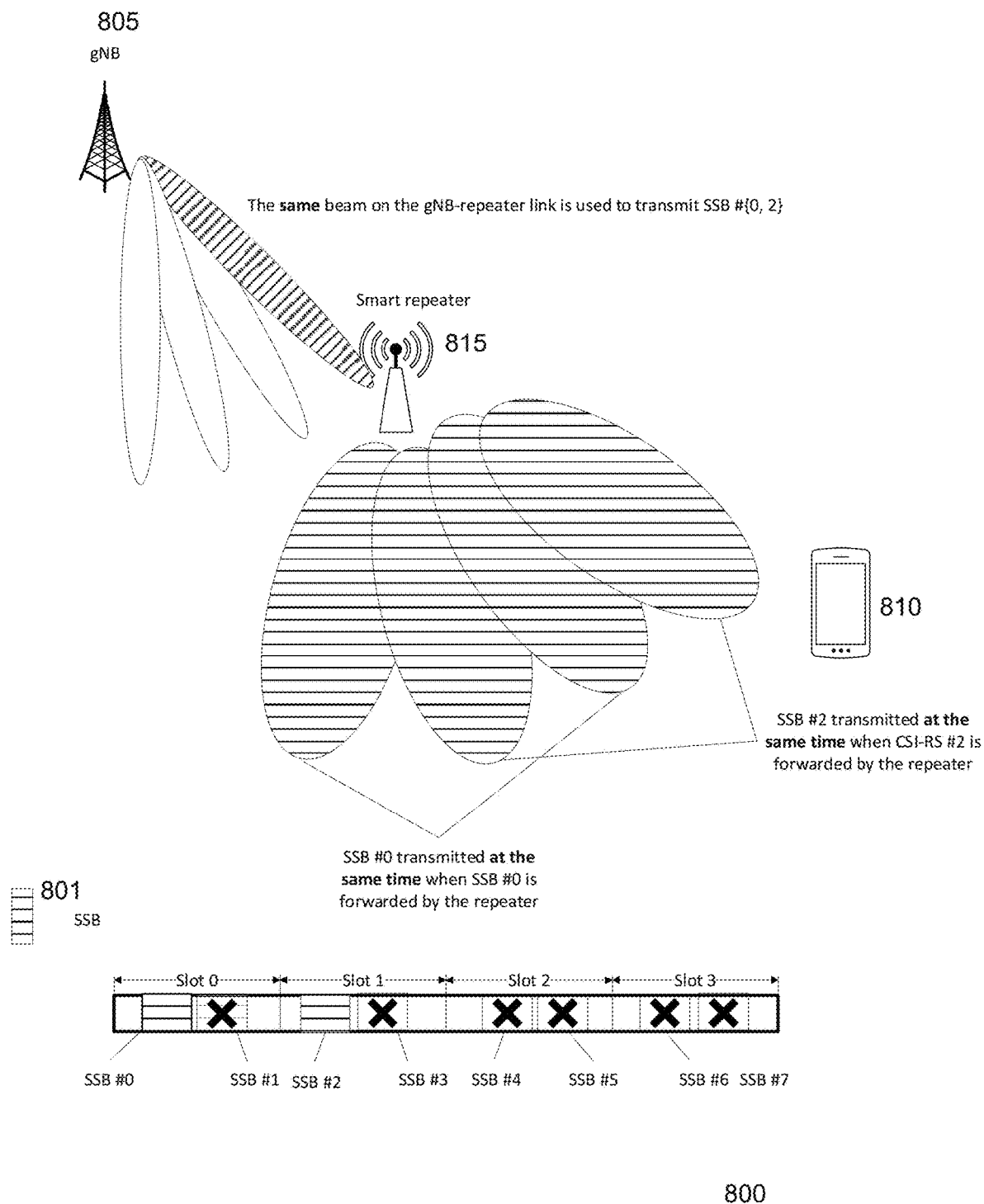
FIG. 8 illustrates mapping 800 of an SSB from the gNB to multiple beams on the repeater-UE link, according to an embodiment.

FIG. 8 illustrates mapping 800 of an SSB 801 from the gNB 805 to multiple beams on the repeater 815-UE 810 link, according to an embodiment. Specifically, the repeater 815 may simultaneously forward the same SSB over multiple beams on the repeater 815-UE 810 link, which may be beneficial to reduce the number of SSBs that the gNB 805 needs to allocate for the repeater 815. Compared with FIG. 4, the gNB 805 instructs the repeater 815 to forward only two SSBs, as shown in FIG. 8, instead of 4 in the previous example.

The same procedures described in the case of one-to-one mapping may be extended for the case of one-to-many mapping for indicating the repeater capability, the purpose of SSB, their locations, etc.

Many-to-One Mapping

In some cases, a repeater may have a limited capability and may not be able to construct distinct beams for each forwarded CSI-RS or SSB, as in the case of one-to-one mapping, or construct multiple beams for each CSI-RS or SSB, as in case of one-to-many mapping.

Figure 9:
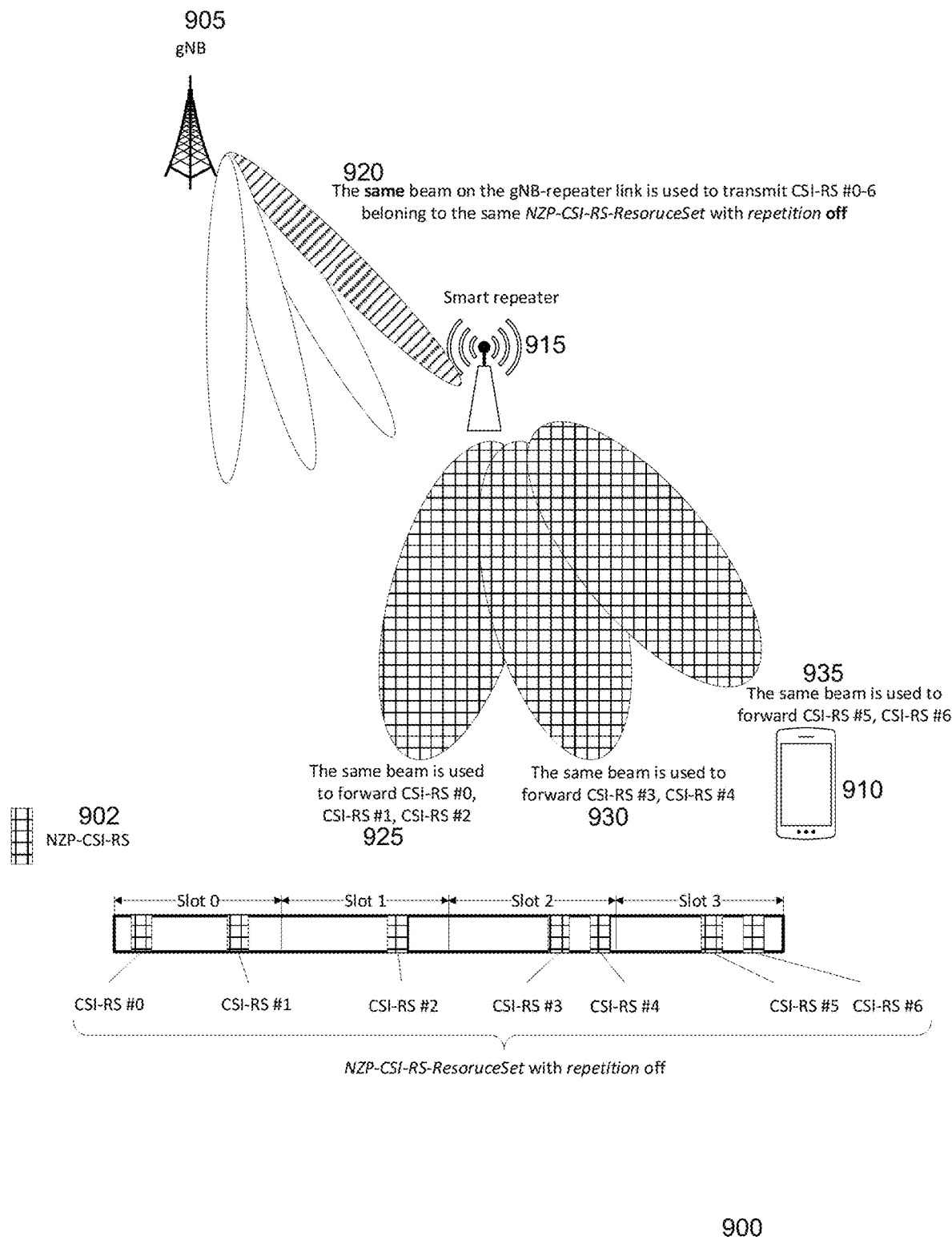
FIG. 9 illustrates mapping 900 of multiple CSI-RSs from the gNB to a beam on the repeater-UE link, according to an embodiment.

FIG. 9 illustrates mapping 900 of multiple CSI-RSs 902 from the gNB 905 to a beam on the repeater 915-UE 910 link, according to an embodiment. Specifically, multiple forwarded CSI-RSs can be mapped to the same beam on the repeater 915-UE 910 link by a set of CSI-RSs 902 being determined to be mapped to one beam, and the repeater 915 applies the same beam in each transmitting occasion associated with that CSI-RS 902. As illustrated in FIG. 9, CSI-RS #0, CSI-RS #1, and CSI-RS #2 belong to one set that is mapped to the same beam 925. Therefore, when the repeater forwards CSI-RS #0, CSI-RS #1, and CSI-RS #2 in their corresponding time occasions, the same beam is used. Similarly, CSI-RS #3 and CSI-RS #4 are mapped to the same beam 930, and CSI-RS #5 and CSI-RS #6 are mapped to another beam 935.

The same procedures described in case of one-to-one mapping may be extended for the case of many-to-one mapping for indicating the repeater capability, the purpose of CSI-RS, their locations, etc.

Although the previous example is for CSI-RS, the same concept can easily be extended when the repeater forwards an SSB on the repeater-UE link.

From a UE perspective, the legacy behavior may be applied and each CSI-RS may be treated as if it is transmitted from a different beam and the corresponding measurements may be reported, e.g., L1-RSRP, even if they are mapped to the same beam.

Repeater Assists gNB to Associate RS with Actual Beams

Figure 10:
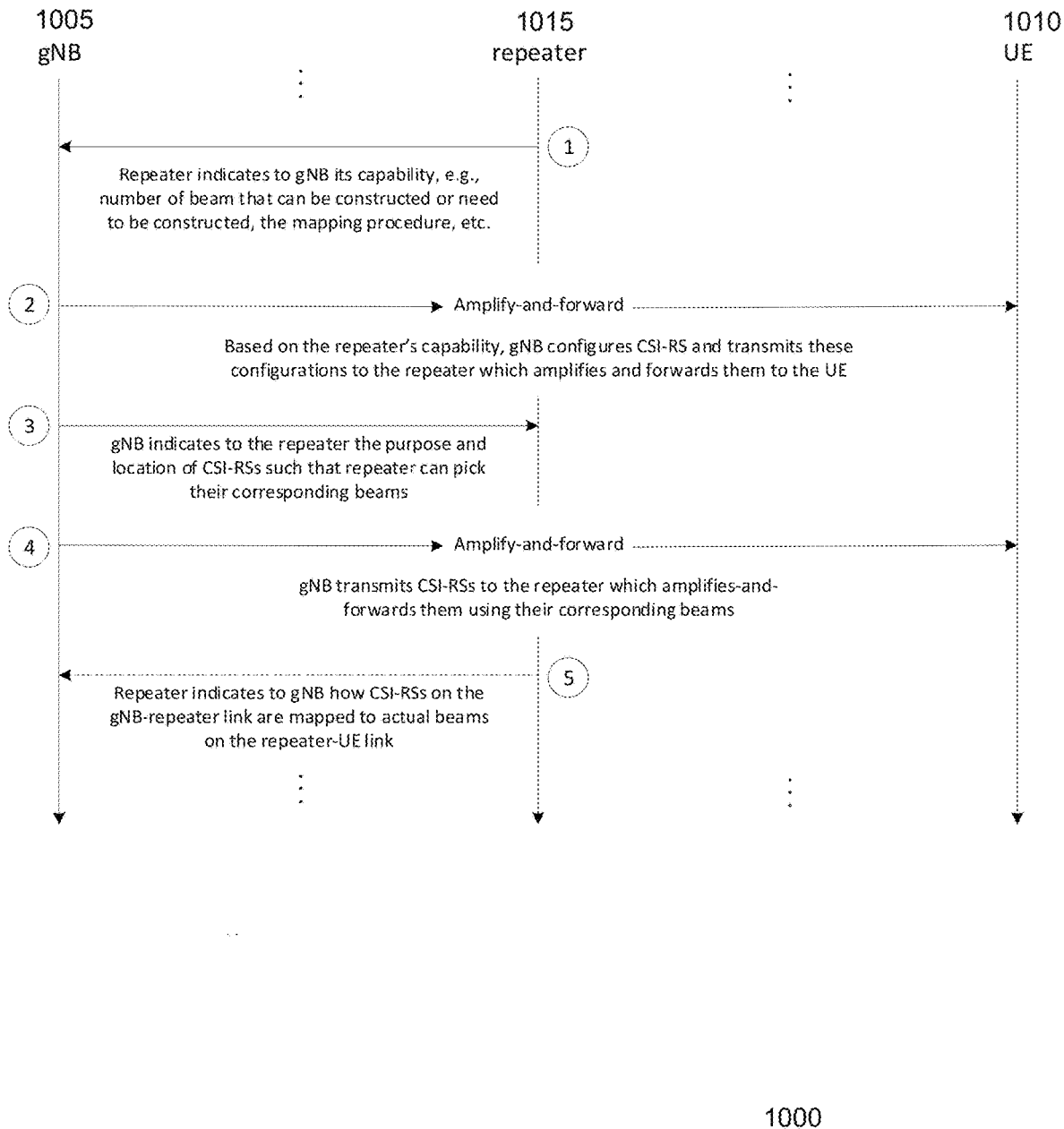
FIG. 10 illustrates a method 1000 of information exchange between the gNB and repeater for a beam management procedure, according to an embodiment.

FIG. 10 illustrates a method 1000 of information exchange between the gNB 1005 and repeater 1015 for a beam management procedure, according to an embodiment.

Regardless of which mapping procedure is applied, it may beneficial that a repeater indicate its capabilities to a gNB. In step 1, the repeater may indicate its capability regarding how CSI-RS or SSB on the gNB 1005-repeater 1015 link will be mapped to actual beams on the repeater 1015-UE 1010 link, such as one-to-one mapping, one-to-many mapping, or many-to-one mapping. The capability may also include the number of beams that the repeater 1015 can construct per SSB or the number of SSBs needed by the repeater 1015 to cover the intended area.

In step 2, with such information, a gNB 1005 can decide how many RSs or SSBs are intended to be transmitted for the purpose of beam management and transmit this configuration, to the repeater 1015, which amplifies and forwards the configuration to the UE 1010.

Since the repeater 1015 only amplifies-and-forwards the configurations of the RSs, the repeater 1015 will be unaware of the corresponding locations which can be indicated by the gNB 1005. In step 3, therefore, the gNB 1005 indicates, to the repeater 1015, the set of SSBs to be forwarded on the repeater 1015-UE 1010 link, such as by indicating the purpose and location of CSI-RSs enabling the repeater 1015 to select their corresponding beams, as previously described.

In step 4, based on the provided information the repeater 1015, the repeater 1015 decides which beam to be applied to which CSI-RS or SSB.

In step 5, the repeater 1015 may inform the gNB 1005 which CSI-RS or SSB is mapped to which actual beam. Step 5 is unnecessary in one-to-one mapping; however, for many-to-one and one-to-many mapping, step 5 is beneficial for enabling the gNB 1005 to be aware of such an association that can be used to facilitate the scheduling.

Although the repeater is unaware of the actual index of CSI-RSs transmitted on the gNB-repeater link, the repeater may be aware of total number of CSI-RSs used for P2 based on the provided indicator from the gNB. If it is a bitmap, e.g., as shown FIG. 6, then the total number of CSI-RSs is the total number of bits that are set to one. In this case, the repeater may provide the gNB with information for mapping CSI-RSs on the gNB-repeater link to actual beams on the repeater-UE link as shown below in Table 2.

When forwarding SSB, the repeater is aware of the SSB ID, similar to any a typical UE. The repeater may provide the gNB with information similar to the information shown below in Table 2. A difference is that the left column includes the SSB ID, which the repeater can determine similar to a typical UE.

TABLE 2

| Transmitted CSI-RS on the gNB-repeater link based on the indicator provided from the gNB to the repeater | Actual beam index on the repeater-UE link | Comments |
| --- | --- | --- |
| CSI-RS #1 (corresponding to the most significant bit set to one in the bitmap) | 1 | This means that CSI-RS #1-3 are mapped to the same beam (many-to-one mapping) |
| CSI-RS #2 (corresponding to the second most significant set to one bit in the bitmap) | 1 | |
| CSI-RS #3 (corresponding to the third most significant set to one bit in the bitmap) | 1 | |

TABLE 2-continued

| Transmitted CSI-RS on the gNB-repeater link based on the indicator provided from the gNB to the repeater | Actual beam index on the repeater-UE link | Comments |
|---|---|---|
| CSI-RS #4 (corresponding to the fourth most significant set to one bit in the bitmap) | 2, 3 | This indicates that the same CSI-RS is mapped to two beams (one-to-many mapping) |
| . | . | |
| . | . | |
| . | . | |
| CSI-RS #N (corresponding to the least significant bit set one in the bitmap) | m | |

FIG. 11 illustrates a MAC-CE indicating a mapping 1100 of CSI-RS on the gNB-repeater link to the actual beam on the repeater-UE link, according to an embodiment. As illustrated in FIG. 11, if the repeater receives multiple bitmaps to indicate the presence of a CSI-RS, the repeater may concatenate the bitmaps to construct the information in Table 2, until such information is provided to the gNB. The repeater may use a MAC-CE to convey such information as shown in FIG. 11. For example, the repeater can provide the gNB with this information through higher layer signaling such as an RRC or a MAC-CE. Another MAC-CE may separately indicate the actual beams for forwarding the SSBs, and the CSI-RS indices in FIG. 11 may be replaced with SSB indices. Alternatively, the same MAC-CE may carry information about the mapping of CSI-RS and SSB. In this case, additional octal(s) (Oct) may be introduced to carry the SSB indices and the corresponding beam index. Also, an additional 1-bit field may be introduced to indicate whether the MAC-CE carries the mapping information of CSI-RS or both CSI-RS and SSB.

The mapping between CSI-RSs in NZP-CSI-RS-ResourceSet with repetition off and the actual beams on the repeater-UE link can be performed using some rules in some cases. For example, in one-to-one mapping, a CSI-RS indicated with a most significant bit set to one in the time domain bitmap may be mapped to actual beam #1, a CSI-RS indicated with a second most significant bit set to one in the time domain bitmap may be mapped to actual beam #2, etc. The same concept can be extended to SSB. Specifically, in case of one-to-one mapping, within the set of SSBs that the gNB indicates to the repeater to forward, the SSB with the lowest ID is mapped to actual beam #1, the SSB indicated with the second lowest ID is mapped to actual beam #2, etc.

Depending on the duration spanned by the time indication method used to inform the repeater with the location of CSI-RS or SSB, e.g., a bitmap, the same CSI-RS or SSB may appear multiple times. Also, the same CSI-RS or SSB may appear in multiple time indications, such as consecutive bitmaps. This scenario may occur when a periodic (P) or semi-persistent (SP) CSI-RS is configured, or even for an aperiodic (AP) CSI-RS that is triggered multiple times because the QCL assumes the AP CSI-RS is configured by the RRC.

The UE expects that the same beam is used to transmit a CSI-RS or SSB for each transmission occasion in the case of periodic or semi-persistent resources. Also, for AP-CSI-RS, the UE expects the same configured QCL source in CSI-AssociatedReportConfigInfo to be applied once CSI-AperiodicTriggerState is triggered by the CSI request field in the triggering DCI.

To maintain transparency to the UE of the presence of the repeater, the gNB may indicate such information to the repeater.

For example, the gNB may provide the repeater with a CSI-RS Id, e.g., NZP-CSI-RS-ResourceId and/or the corresponding resource set ID, NZP-CSI-RS-ResourceSetId. For the SSB, the gNB map provide the repeater with SSB-Index and/or csi-SSB-ResourceList. The gNB can provide the repeater with a pair of indices (CSI-RS Id, resource set Id) or (SSB Id, SSB resource set Id). This may be beneficial because the same CSI-RS or SSB may belong to multiple resource sets. For each CSI-RS or SSB, the gNB can provide the corresponding time domain location using the described procedures above or any other procedures.

Figure 12:
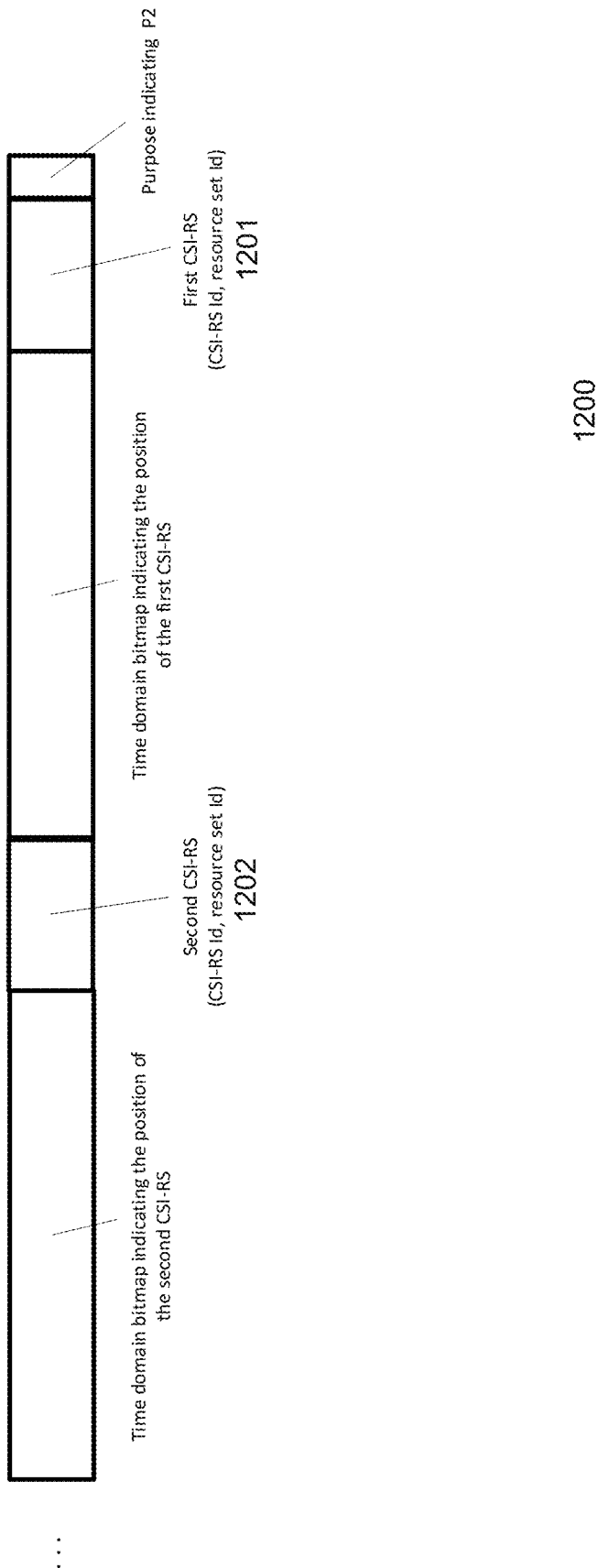
FIG. 12 illustrates an indication 1200 of a CSI-RS Id and the accompanying time domain position, according to an embodiment.

FIG. 12 illustrates an indication 1200 of a CSI-RS Id and the accompanying time domain position, according to an embodiment. In FIG. 12, the gNB may indicate the CSI-RS Id 1201, 1202 without providing the repeater with a resource set Id to reduce the signaling overhead. This information can be carried by DCI, MAC-CE, or RRC.

Once the repeater receives this information, the repeater can freely select a beam when forwarding the OFDM symbols carrying such an CSI-RS or SSB. However, the same beam should be applied for each occasion in which the CSI-RS or SSB is transmitted. As mentioned above, for the cell-defining SSB, the gNB may not need to indicate information about the SSB index or its time location as such information can be easily determined by the repeater similar to a typical UE. In this case, the repeater may continue to apply the same beam when forwarding the symbols containing the SSB in each occasion that SSB is transmitted.

A particular timeline can be applied after which the indicated information is applied. The timeline may depend on how the information is carried.

For example, if a PDCCH is used to carry the information, then it may be applied after K OFDM symbols after the last symbol carrying the PDCCH. The value of K may be configured or predefined. This may be similar for UE capability 1 or 2 for the reception of PDSCH. The K OFDM symbols may be equal to timeDurationForQCL indicated by the mobile part of the repeater. In this case, the indicated beam information by DCI may be applied after timeDurationForQCL time offset between the reception of DCI carrying the beam indication and time location at which the indicated beam is to be applied.

For DCI based indication, the number of bitmaps to be included in the DCI may be indicated by higher layer signaling or predefined. Since some of the bitmaps may not be used each time, a special value may be indicated to inform the repeater that this bitmap is not used while maintaining a fixed DCI payload size. For example, all zeros may be used as a special value.

In case of using a MAC-CE to carry the indication from the gNB to the repeater, the repeater may apply the provided indication after the repeater transmits a HARQ-Ack of that MAC-CE. For example, the indication may be applied in the first slot after slot n+3N$_{slot}^{subframe,\mu}$, where n is the slot for the HARQ-Ack of the MAC-CE. When using an RRC, a particular offset at which the indicator is applied may be signaled through higher layer signaling or predefined, or according to some rules as in the case of MAC-CE. This offset value may also indicate when the indicated beam is to be applied with a period of beam indication and the same offset is applied in each period. The offset may be an offset to the slot at which the indicated beam is to be applied. An additional offset value may be indicated by higher layer signaling to indicate which symbol within the slot the indicated beam should be applied.

The above-described operations may be beneficial for the P2 procedure, and the repeater may not need to report, to the gNB, how the CSI-RS is mapped to the actual beam on the repeater-UE link. That is, the mapping to an actual beam may be transparent to the gNB.

When the gNB indicates, to the repeater, which beam should be used to forward the DL transmission, the gNB can rely on information provided by the repeater to indicate which beam should be used. Alternatively, the gNB may use an SSB Id, CSI-RS Id, and/or the corresponding resource set Id. Specifically, throughout the disclosure, for each occasion the gNB relies on information from the repeater to indicate which beam the repeater should use to forward the DL transmission, the gNB may use the SSB Id, CSI-RS Id, and/or the corresponding resource set Id. In this case, the repeater is expected to apply the same beam as the beam used for the indicated SSB or CSI-RS.

Associate DL Signals/Channels with Transmit Beams at the Repeater (P3 Procedure)

In the P3 procedure, the repeater cannot freely select the actual beams used to forward the CSI-RS to a UE. That is, the UE expects that all CSI-RSs belonging to the same NZP-CSI-RS-ResourceSet are transmitted using the same beam when repetition is set to on. The repeater may be unaware of which CSI-RSs belong to the same NZP-CSI-RS-ResourceSet and unaware of whether repetition is on or off. Also, in the P2 procedure, if the gNB indicates, to the repeater, that the CSI-RSs to be forwarded are associated with the beam used for forwarding particular SSB, the repeater has the freedom to alter that beam for forwarding CSI-RS while maintaining some common properties with the beam used for forwarding SSB, such as the spatial direction, as in the QCL type D described above in FIG. 5. In other words, as a possible example, the repeater forwards these CSI-RSs, such that the wide beam used for forwarding the associated SSB represents a source RS for QCL-type D for the beam used for forwarding CSI-RS at least from UE perspective.

When a UE is connected directly to a repeater, the reasonable gNB behavior for conducting P3 procedure is to use the best reported beam by the UE in a P2 procedure to transmit a CSI-RS in a P3 procedure. In other words, after the P2 procedure, the gNB becomes aware of a preferred DL beam based on the UE reporting. Therefore, in the P3 procedure, the gNB is expected to use this beam for all CSI-RSs belonging to the same NZP-CSI-RS-ResourceSet with repetition set to on. This may be beneficial as the UE adjusts its' receive beam in the P3 procedure, based on the best reported DL beam in the P2 procedure.

Since the repeater only forwards the reports from the UE to the gNB and does not decode these reports, the repeater is unaware of the preferred DL beam indicated by the UE. In this case, the gNB should indicate, to the repeater, which beams should be used in the P3 procedure. Also, the gNB may need to indicate, to the repeater, the associated beam that should be used for forwarding the RS for P2 and indicate which common properties should be maintained between the beam used for forwarding SSB and used for forwarding RS for P2.

For example, the gNB may provide the repeater with the purpose, similar to the indication for P2 in Table 1, and the time domain, similar to the time domain indication for P2.

The repeater may need to be aware of whether the indicated CSI-RSs belong to the same or a different NZP-CSI-RS-ResourceSet to determine whether the same beam should be applied.

Figure 13:
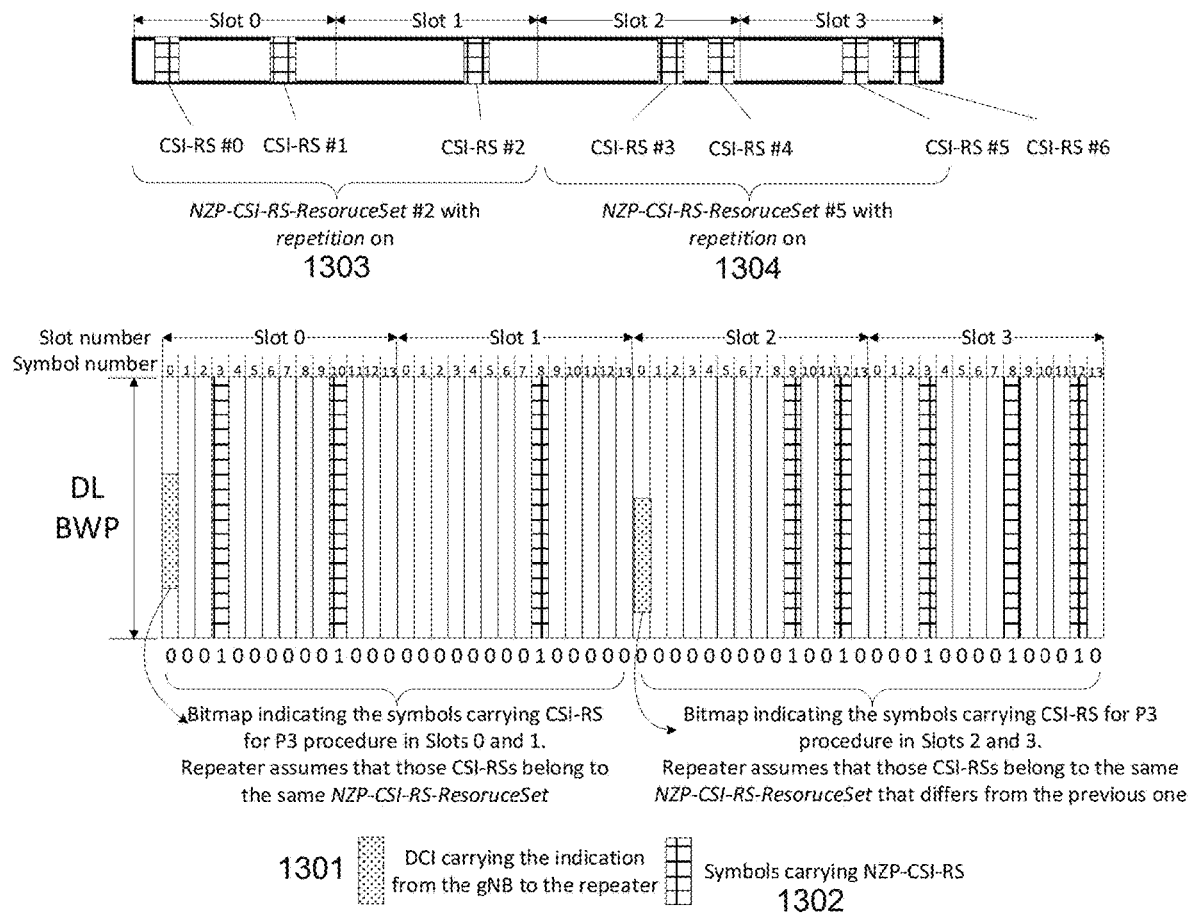
FIG. 13 illustrates an indication 1300 of a CSI-RS belonging to a same NZP-CSI-RS resource set, according to an embodiment.

FIG. 13 illustrates an indication 1300 of a CSI-RS belonging to a same NZP-CSI-RS resource set, according to an embodiment. In FIG. 13, the CSI-RSs whose time domain information are provided in one indication are assumed to belong to the same NZP-CSI-RS-ResourceSet. When using DCI 1301 to carry the beam indication for CSI-RS, the repeater may assume that the CSI-RSs indicated by a particular DCI belonging to the same NZP-CSI-RS-ResourceSet 1303 differ from an NZP-CSI-RS-ResourceSet 1304 used by CSI-RSs indicated by other DCI 1301, as illustrated.

When using higher layer signaling, e.g., a MAC-CE or an RRC, the same approach may be used to implicitly indicate whether the indicated CSI-RSs belong to the same or different NZP-CSI-RS-ResourceSet.

Alternatively, the indication transmitted from the gNB, to the repeater, may carry a flag pointing to whether the indicated CSI-RSs belong to the same NZP-CSI-RS-ResourceSet, or even the index of the NZP-CSI-RS-ResourceSet itself.

For example, the indicator, either DCI, a MAC-CE, or an RRC, may have multiple bitmaps indicating the time location of CSI-RSs where each bitmap corresponds to a particular NZP-CSI-RS-ResourceSet.

Table 3 below shows how multiple bitmaps can indicate the location of CSI-RSs within one slot for multiple NZP-CSI-RS-ResourceSets. Each row corresponds to a particular NZP-CSI-RS-ResourceSet. The repeater may not need to be aware of the actual index of NZP-CSI-RS-ResourceSet.

TABLE 3

| Bitmap spanning one slot | | | | | | | | | | | | | |
|---|---|---|---|---|---|---|---|---|---|---|---|---|---|
|   | 1 | 1 |   |   |   | 1 | 1 |   |   |   |   |   |   |
| 1 |   |   |   |   |   |   | 1 |   |   | 1 |   | 1 |   |
|   |   |   | 1 |   |   |   |   | 1 |   |   |   |   | 1 |
|   |   |   |   | 1 |   |   |   |   |   | 1 |   | 1 |   |

*Empty boxes represent a zero value

Additional field(s) may be included to provide the repeater with the index of an NZP-CSI-RS-ResourceSet associated with the indicated bitmap. This solution may be beneficial to avoid having dependency between the number of configured NZP-CSI-RS-ResourceSets with repetition off and the number of fields needed to indicate the location of CSI-RSs.

As described above, in P3, the reasonable behavior is to repeat CSI-RSs belonging to a particular NZP-CSI-RS-ResourceSet using the preferred beam indicated by the UE during the P2 procedure. Therefore, it may be beneficial if a gNB can indicate, to the repeater, which beam the repeater should use to transmit CSI-RSs belonging to a particular NZP-CSI-RS-ResourceSet with repetition set to on.

For example, the gNB may exploit the information of how CSI-RSs in the gNB-repeater link are mapped to actual beams in the repeater-UE link. This mapping information may be transmitted from the repeater to the gNB as described above in FIG. 11, or by any other suitable approach. In this case, the gNB may indicate, to the repeater, which beam should be applied to the CSI-RSs belonging to the NZP-CSI-RS-ResourceSet with repetition set to on. For example, CSI-RSs in P2 are mapped to 16 actual beams, and a four-bit field can indicate, to the repeater, which beam should be used in P3.

The field indicating the beam for transmitting CSI-RSs as part of P3 can be part of DCI, a MAC-CE, or an RRC, depending on how the indicator is provided from the gNB to the repeater.

In another method for the gNB to indicate, to the repeater, which beam should be used to transmit RS for P2 or P3, the gNB may indicate, to the repeater, the actual beam index as described above and may provide additional information to indicate whether the indicated beam should exactly be applied or an associated beam having common properties with the beam to be used for forwarding the RS may be used. The gNB may indicate, to the repeater, which common properties should be maintained between the actual indicated beam and the beam to be used for forwarding the RS for either P2 or P3.

Figure 14:
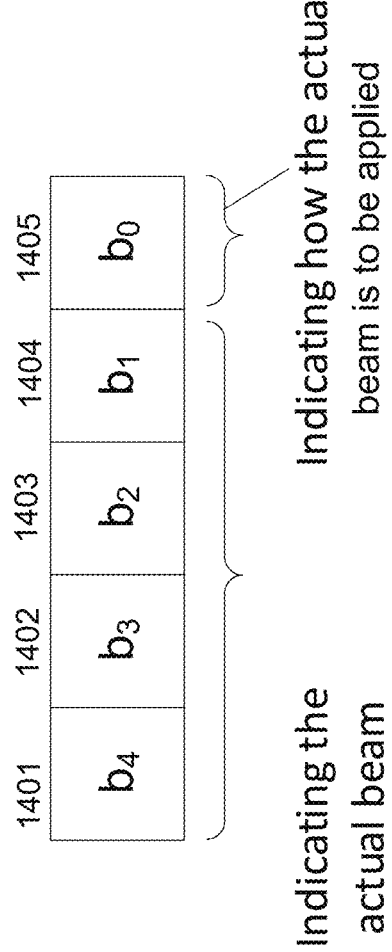
FIG. 14 illustrates beam indication and its properties 1400, according to an embodiment.

FIG. 14 illustrates beam indication and its properties 1400, according to an embodiment. Specifically, FIG. 14 illustrates an example of a 5-bit field, wherein the most significant 4 bits 1401-1404 indicate the actual beam and the least significant bit 1405 indicates how this beam to be applied. The b0 bit 1405 can indicate whether the actual beam to be applied as-is, e.g., it is set to zero, which is beneficial in case of forwarding RS for P3 procedure.

On the other hand, if b0 bit 1405 is set to one, the repeater may determine the forwarding beam such to have some common properties with the actual indicated beam by the most significant 4 bits 1401-1404 which is beneficial for RSs for P2, as illustrated. This common property(ies) may be predefined, i.e., provided in specs, or configured to the repeater by higher layer signaling, such as RRC or MAC-CE. For example, the gNB may configure this property to be QCL-typeD. In this case, the repeater should ensure that the indicated actual beam can be considered as source QCL-typeD from the UE perspective of the constructed forwarding beam.

Figure 15:
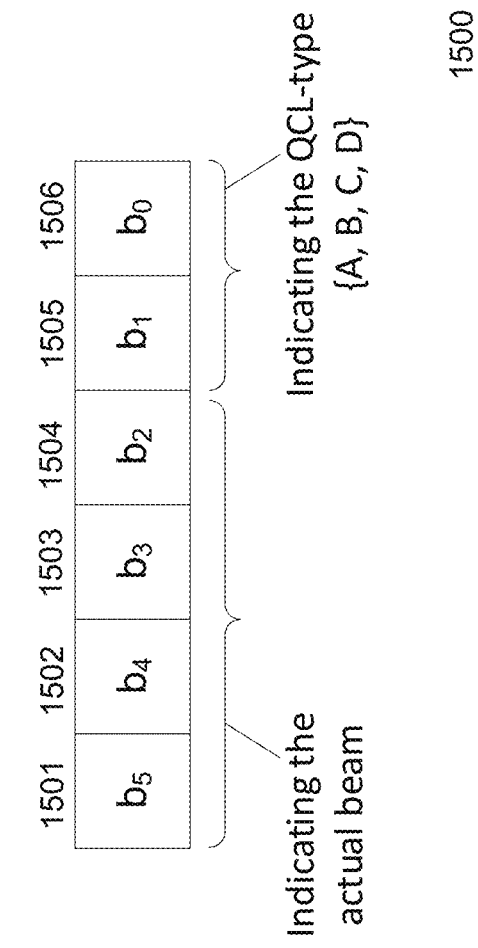
FIG. 15 illustrates beam and quasi co-location (QCL)-type indication 1500, according to an embodiment.

FIG. 15 illustrates beam and QCL-type indication 1500, according to an embodiment. That is, a 2-bit field 1505, 1506 may indicate the relation between the indicated actual beam and the constructed beam for forwarding RS for P2 or P3. Specifically, the 2-bit field may indicate the QCL type that the repeater should preserve between the indicated actual beam and the constructed beam. In other words, from the UE perspective, the indicated actual beam by the most significant bits 1501, 1502, 1503, 1504 and the constructed beam should have the indicated QCL type by the least significant bits 1505, 1506. Each code point may indicate to particular QCL type from types {A, B, C, D}. Also, the gNB may configure a subset of QCL types that possibly to be indicated and bit width of the field is determined accordingly.

These fields indicating the beam and the additional information for the relation between the indicated actual beam and constructed beam can be part of DCI, MAC-CE, or RRC depending on how the indicator is provided from the gNB to the repeater.

Although the previous examples describe that the gNB indicates, to the repeater, the actual beam to be used as a reference beam to determine the forwarding beam, the gNB may instead indicate an SSB Id, CSI-RS Id, and/or the corresponding resource set Id as described above. Specifically, the repeater is expected to use the previously used beam for forwarding the indicated SSB or CSI-RS as a reference beam to determine the new forwarding beam.

Figure 16:
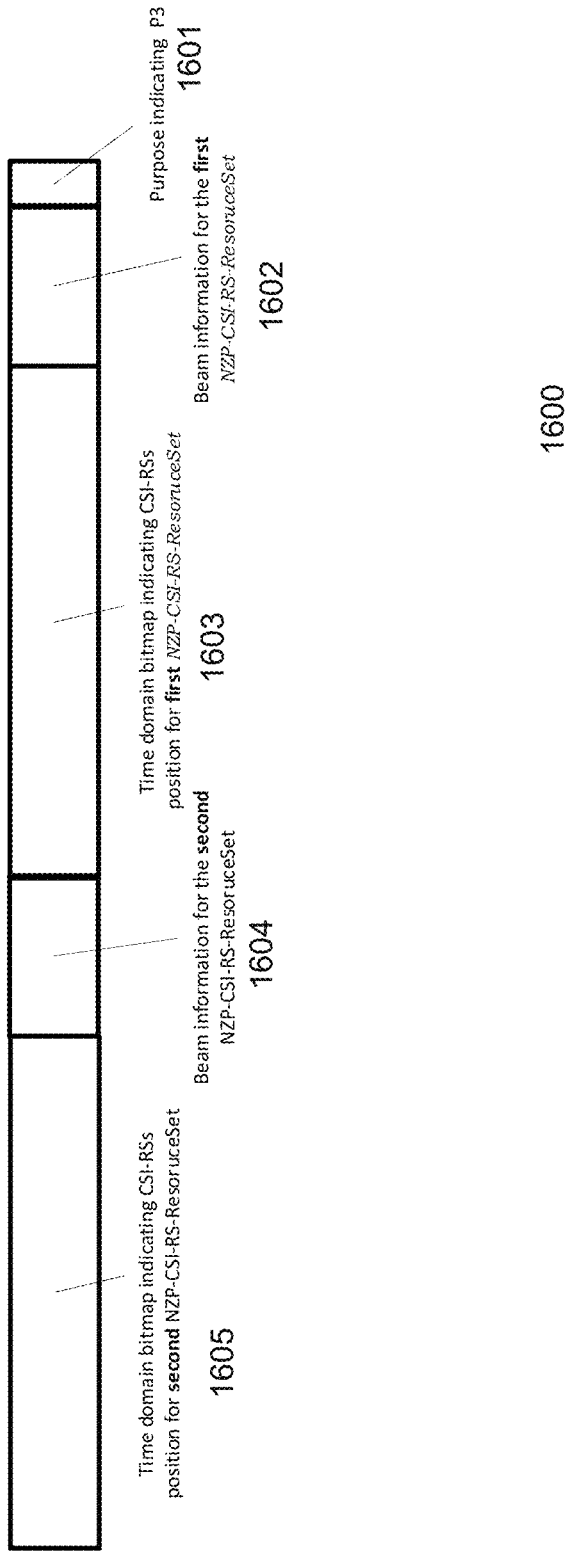
FIG. 16 illustrates field indication for a P2 or P3 procedure 1600, according to an embodiment.

FIG. 16 illustrates an indicator 1600 for a P2 or P3 procedure according to an embodiment. The indicator in FIG. 16 is from the gNB, to the repeater. The purpose field 1601 indicates that the indicated CSI-RS is used for the P3 or P2 procedure. Another field 1602 shows the beam that the repeater should apply when forwarding all CSI-RS with a first NZP-CSI-RS-ResourceSet with repetition set to on or off, in their time position, as indicated by the time domain bitmap field 1603. Another field 1604 for the beam indication and time domain indication for CSI-RSs belong to a second (i.e., the next) NZP-CSI-RS-ResourceSet with repetition set to on or off, as indicated by field 1605.

For DCI or MAC-CE based indication, the number of bitmaps to be included in the DCI may be indicated by higher layer signaling or may be predefined. Since some of the bitmaps may not be used each time, special values may be indicated to inform the repeater that a bitmap is not used while keeping the DCI payload size fixed. For example, all zeros may be used as a special value.

For RRC or MAC-CE based indication, the beam indication field and time indication fields may form a tuple (i.e., beam index, time information) that is conveyed from gNB to the repeater such that the repeater becomes aware of which beam should be applied at which time domain resources. Based on FIG. 16, two tuples (beam index (1602), time information (1603)), (beam index (1604), time information (1605)) can be indicated. Moreover, each tuple may have a particular index that may be configured by RRC. In this case, for periodic beam indication by RRC, the gNB may indicate to the repeater the applicable tuple(s) in each period. In case of using a MAC-CE for convoying the beam information from the gNB to the repeater, the MAC-CE may indicate a single or multiple tuple indices out of those tuples configured by RRC.

Figure 17:
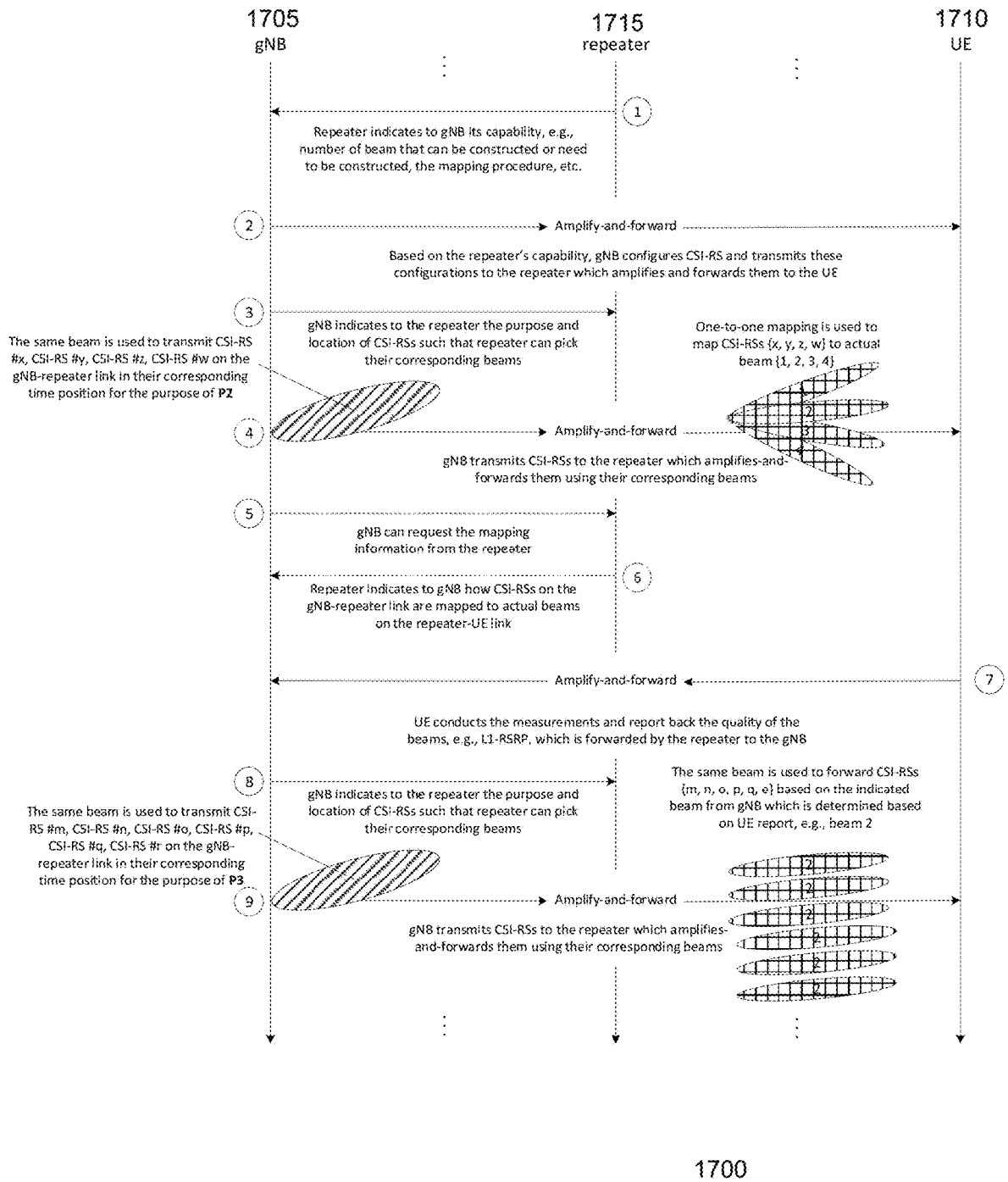
FIG. 17 illustrates a P2 and P3 procedure 1700, according to an embodiment.

FIG. 17 illustrates a P2 and P3 procedure 1700, according to an embodiment. In particular, FIG. 17 illustrates an overall procedure for P2 and P3, which is an extension of FIG. 10 with some modification.

Specifically, in step 4, the repeater 1715 forwards four CSI-RSs {CSI-RS #x, CSI-RS #y, CSI-RS #z, CSI-RS #w} that belong to the NZP-CSI-RS-ResourceSet with repetition set to off. In this case, the repeater 1715 applies different beam forming for each CSI-RS and one-to-one mapping is assumed, though other mapping procedures can be applied.

In step 5, the gNB 1705 may request the repeater 1715 to provide the gNB 1705 with information of how CSI-RSs are mapped to actual beams by the repeater 1715.

In step 6, the repeater 1715 provides the gNB 1705 with information of how the CSI-RSs are mapped.

Following the legacy procedure, the UE 1710 measures the beam qualities and reports the indicated metric, e.g., L1-RSRP, which is forwarded by the repeater 1715 to the gNB 1705, as shown in step 7.

In step 8, the P3 procedure in beam management starts in which the gNB 1705 indicates to the repeater 1715 the purpose of CSI-RS, which beams should be applied by the repeater 1715 for each NZP-CSI-RS-ResourceSet with repetition set to on as shown in step 9.

Repeater is Aware of the CSI-RS Configurations for its UEs

To perform the beam refinement on the repeater-UE link, the repeater may attempt to detect/decode the signals/channels that would be transmitted to the UE. This may be beneficial as the repeater becomes aware of CSI-RS configurations transmitted from the gNB to the UE. In other words, the repeater attempts to understand the UE's configurations and acts accordingly when forwarding the RSs for beam management.

This is beneficial as there is no additional signaling required to accomplish the beam management procedure P2 and P3 and is justifiable because the repeater on the gNB-repeater may be treated as a typical UE. Nevertheless, as the number of UEs served by the repeater increases, the complexity of repeater implementation increases. Therefore, it is beneficial for the repeater to indicate, to the gNB, the maximum number of UEs that the repeater can serve using this mode through capability signaling. Such capability signaling may be similar to those transmitted by the UE.

For the repeater to be able to decode the CSI-RS configurations and to be aware of when the CSI-RSs is triggered or activated, the repeater should decode such transmission before forwarding the transmission to the UE. Therefore, the repeater should be aware of different scrambling RNTIs for its UEs, e.g., a C-RNTI. As such, the gNB may provide the repeater with the RNTIs of UEs under its coverage through higher layer signaling such as an RRC or a MAC-CE.

Once such information is received by the repeater, the repeater is able to decode the CSI-RS configurations of those UEs and monitor when they are (de)activated/triggered and act accordingly.

Alternatively, to reduce the repeater complexity and avoid forcing the repeater to decode every transmission for the UEs served by the repeater, the gNB may provide the repeater with lumped configurations of each UE to be served by the repeater. Such information may be provided by higher layer signaling dedicated to the repeater.

For periodic CSI-RSs in a P2 or P3 procedure, i.e., CSI-RSs belong to an NZP-CSI-RS-ResourceSet with repetition set to off or on, the repeater becomes aware of when they will be transmitted. The unclear issue is how the repeater interprets the RRC parameter qcl-InfoPeriodicCSI-RS. In legacy NR, when the UE is directly connected the gNB, qcl-InfoPeriodicCSI-RS points to a reference signal that is used as source RS for providing the QCL assumption to the UE.

For example, the repeater may interpret the RRC parameter qcl-InfoPeriodicCSI-RS relative to the actual beams that the repeater constructs on the repeater-UE link to forward the gNB's signals/channels to the UEs. To make the gNB aware of the actual beams constructed at the repeater, the aforementioned procedure in which the repeater transmits information on how some forwarded RSs are mapped to actual beams may be used.

In a semi-persistent CSI-RS, a dedicated MAC-CE transmitted, from the gNB, to the repeater, (this MAC-CE may differ from the one to be transmitted to the UE) may be used. The MAC-CE may be similar to a legacy MAC-CE for activation of a semi-persistent CSI-RS, but TCI State ID field may be interpreted relative the actual beams constructed by the repeater as described above.

In an aperiodic CSI-RS, the triggering DCI, similar to the DCI used in legacy NR, can be used to indicate, to the repeater, which aperiodic CSI-RS is triggered (this DCI may differ from the DCI to be transmitted to the UE). Similarly, the TCI field in the DCI may be interpreted relative the actual beams constructed by the repeater as explained above.

As described above, the repeater may directly interpret the provided TCI state ID with the knowledge of the RS IDs. Specifically, the repeater constructs the forwarding beam such that, from the UE prepositive, the forwarding beam and the beam used as the source RS in the provided TCI have common properties based on the indicated by the QCL type {A, B, C, D}.

Figure 18:
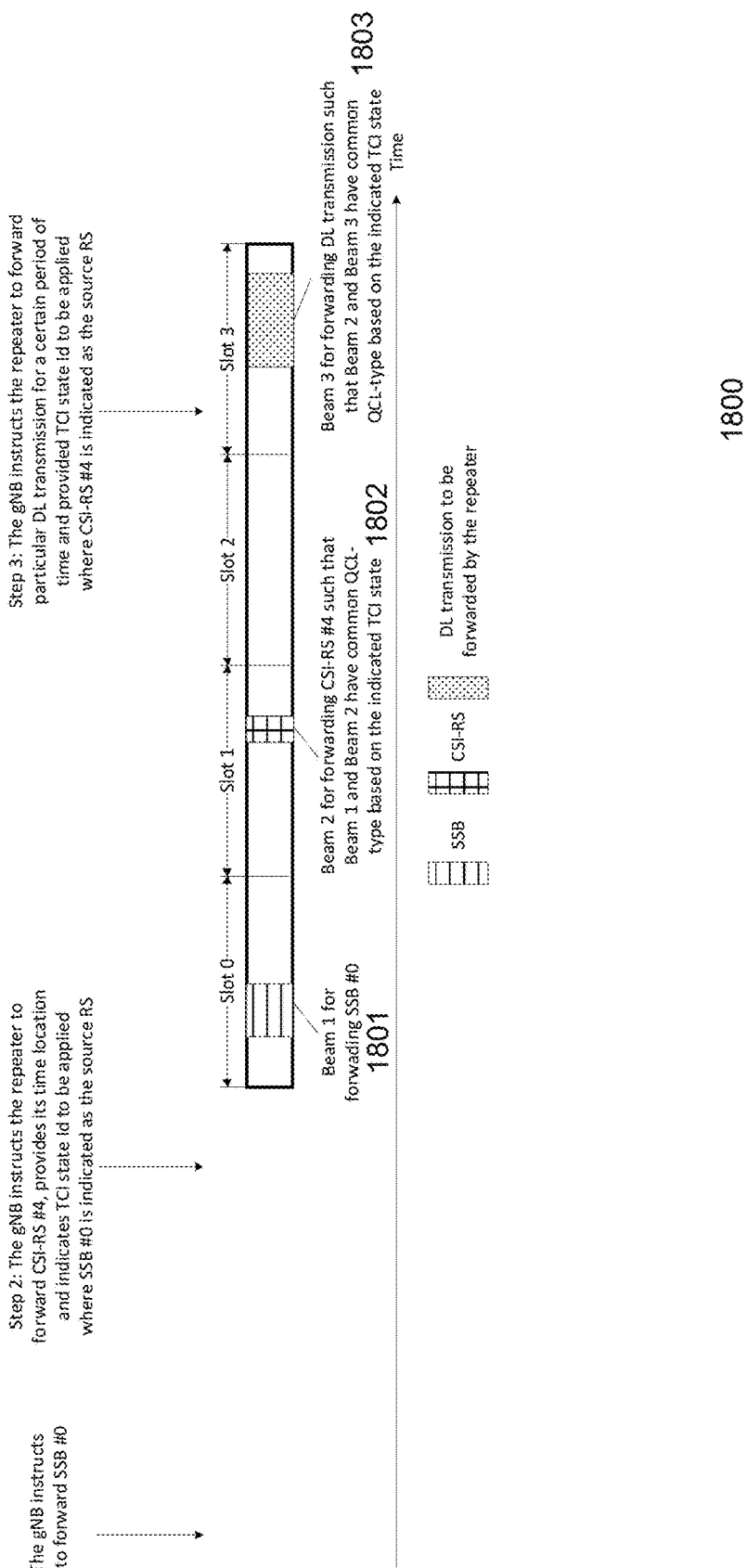
FIG. 18 illustrates TCI state indication for a forwarding beam 1800, according to an embodiment.

FIG. 18 illustrates TCI state indication for a forwarding beam 1800, according to an embodiment. Specifically, FIG. 18 illustrates an example of how a repeater can interpret the indicated TCI state across the time domain.

In step 1, the repeater forwards SSB #0 and constructs a particular beam, e.g., Beam 1 1801. In step 2, the repeater forwards CSI-RS #4 and is aware of its ID (the repeater is aware that it is forwarding CSI-RS #4). The gNB provides repeater with the TCI state ID which indicates SSB #0 as a reference RS and particular QCL-type. In this case, the repeater constructs the forwarding Beam 2 1802 of CSI-RS #4 based on Beam 1 1801 used for forwarding SSB #0 such that, from UE perspective, the received CSI-RS #4 and SSB #0 are QCLed with respect to the indicated type.

In step 3, the gNB instructs the repeater to forward some transmission which is unknown to the repeater, indicates the forwarding time duration and indicate the applicable TCI state ID which indicates CSI-RS as a reference RS and particular QCL-type. In this case, the repeater constructs the forwarding beam of this DL transmission based on the beam used for forwarding CSI-RS #4 such that, from UE perspective, the received DL transmission, e.g., DMRS of this transmission, and CSI-RS #4 are QCLed with respect to the indicated type.

The legacy TCI framework can be extended, such that the repeater can use this framework to construct the forwarding beam based on the beam used for forwarding the reference RS with respect to particular QCL type.

For example, the gNB may configure the repeater with TCI state pool via higher layer signaling, e.g., RRC only or RRC+MAC-CE. This TCI state pool may differ from the TCI state pool configured mobile part of the repeater. To distinguish the two pools, high layer parameter, e.g., within TCI-State IE, may indicate whether the configure pool is for the mobile part of the repeater, for the forwarding link, or for defining a new TCI IE for the forwarding link.

Each TCI state in the TCI pool indicates the reference RS(s) and the applicable QCL-type(s). In this case, the repeater constructs the forwarding Beam such that, from UE perspective, Beam has common QCL type(s) with the earlier beams used as the indicated source RS. The repeater should be aware of the IDs of the forwarded RSs which can be realized as described above or through any other procedures.

Out of this TCI pool, the gNB may (de)activate a subset of the TCI states. A new MAC-CE may be used to indicate the (de)activated TCI states that may be used for indicating the forwarding beam. Alternatively, the same MAC-CE used for (de)activating TCI states for the mobile part of the repeater may be used.

To determine the TCI pool from which activated TCI states are activated, a 1-bit field in the MAC-CE may be used. For example, if the 1-bit field is set to zero or one, then this MAC-CE (de)activates TCI states for the mobile part of the repeater or forwarding link, respectively. For example, in the "enhanced TCI states activation/deactivation for UE-specific PDSCH MAC-CE", there is one reserved bit that can be used for this purpose. Also, in "TCI States Activation/Deactivation for UE-specific PDSCH MAC CE" the number of configured TCI states by RRC should not be multiple integers of 8 such that there is at least 1-bit field left indicating which TCI state pool should be used.

Thereafter, the DCI may be used to indicate the applicable TCI-state in addition to other information such as the time duration in which the repeater forwarding the transmission.

To reduce the signaling overhead, a single TCI-state pool may be configured to both the mobile part of the repeater or forwarding link. In this case, the indicated source RSs are expected to be received by a mobile part of the repeater such that the receiver is aware of its ID, time location, etc. Also, source RSs are forwarded on forwarding link such that repeater can determine the subsequent forwarding beam based on the earlier beam used to forward the source RS. In this case, the legacy MAC-CE may be used to activate a subset of TCI-state for both the mobile part of the repeater and the forwarding link. Also, a separate MAC-CE may be used as previously described to have to separate subsets of the activated TCI states for the mobile part of the repeater and the forwarding link.

Beam Aspects for Scheduling (PDSCH/PDCCH/PUSCH/PUCCH)

Repeater is Unaware of the Configurations for its UEs

In addition to forwarding an RS for different purposes, the repeater may also forward different DL or UL channels. Assuming the repeater is unaware of the configurations of the DL or UL channels, the repeater cannot determine which beam should be used to transmit/receive to/from the UE on the repeater-UE link.

Although different embodiments are described herein with reference to DL channels (PDSCH/PDCCH), the disclosure is not limited thereto and can be extended for UL channels (PUSCH/PUCCH).

In general, a repeater may be unaware of whether it forwards a PDCCH or a PDSCH. The repeater should know the OFDM symbols spanned by channel to be forwarded or which actual beam should be applied.

To support dynamic scheduling, an indication, from the gNB, to the repeater, can be provided in the form of DCI on a PDCCH with a CRC scrambled by an RNTI for the repeater on the gNB-repeater link. The RNTI can be similar to the C-RNTI of a typical UEs. In this case, the repeater may have at least two RNTIs, one which may be used to scramble DCI carrying the beam information from gNB to the repeater and another which is used similar to a typical UE, such as a C-RNTI for receiving dedicated configurations. The legacy approach to configure an SS set and CORESET for the typical UEs may be applied for the repeater.

The indication may carry information in the manner of the information carried in the CSI-RS framework. The gNB may use the same bitmap framework disclosed for the CSI-RS for a P3 procedure as shown in FIG. 16. Specifically, one bitmap may be used to indicate the symbols used for a PDCCH that is to be forwarded on the repeater-UE link while another bitmap is used to indicate the symbols used for a PDSCH that to be forwarded on the repeater-UE link. Each bitmap may be associated with a field indicating which actual beam or TCI-state that the repeater should use for forwarding a PDCCH or a PDSCH, based on how the repeater mapped a CSI-RS for P2 to actual beams as shown in FIG. 11 or any other approach used to inform the gNB of the indices of the actual beams on the repeater-UE link.

Since a PDCCH and a PDSCH are contiguous in the time domain, using an SLIV to indicate occupied OFDM symbols may be more beneficial to reduce overhead. The DCI may directly carry the SLIV value or several SLIV values may be configured, e.g., 16 values, and the DCI only points to which row is to be applied. The values of SLIVs may be similar to the legacy time domain resource allocation (TDRA) table configured by RRC in which a list is provided to the repeater and each entry in the repeater may have an index of the entry, and the starting slot which can be defined as an offset and can be relative to the DCI carrying the indication or relative to the period in case of using RRC or MAC-CE to carry the indication. Rather than configuring the starting slot for each entry, a common offset relative to the DCI/RRC/MAC-CE may carry the indication. This common offset may be configured, predefined (i.e., provided in the specification) or indicated similar the applicability time described herein, based on the processing capability of mobile part of the repeater (processing capability 1 or 2) or the timeDurationForQCL indicated by the mobile part of the repeater. The predefined offset may be the first slot in each period for periodic or semi-persistent beam indication by RRC or MAC-CE.

Another offset can be configured or predefined to indicate the starting symbol within the indicated slot. For example, predefined starting symbol, e.g., symbol #0, is applied in the indicated slot. Both the starting symbol and duration in units of symbols can be jointly encoded, and a single value of SLIV may indicate both the starting symbol and duration at which the repeater applies the indicated slot. Alternatively, the starting symbol and duration can be separately encoded. That is, the RRC can configure separate values of the start symbol and duration by separate RRC parameters to provide the gNB with more flexibility.

Figure 19:
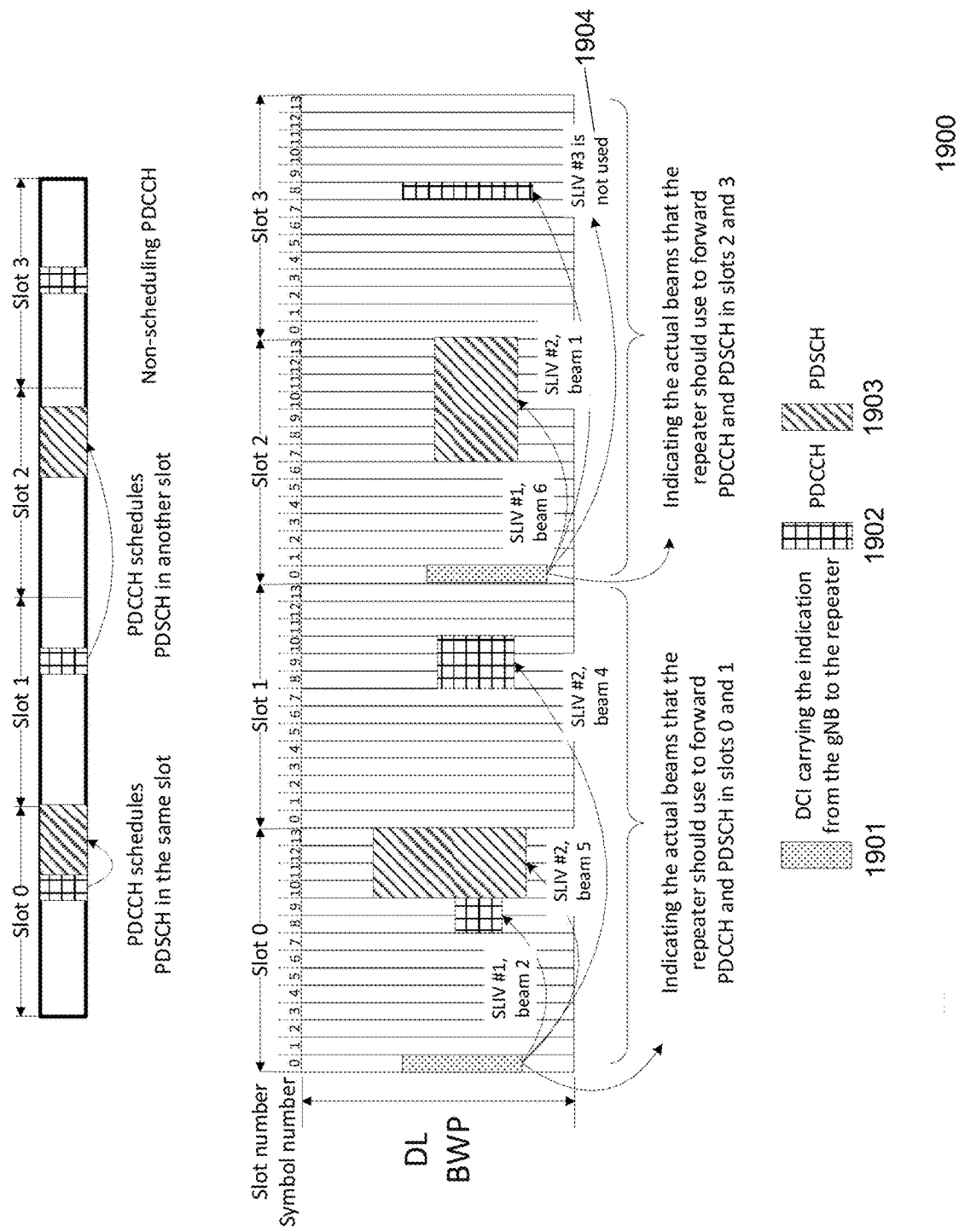
FIG. 19 illustrates a start and length indicator value (SLIV) approach 1900 indicating a DL forwarding location and corresponding beams, according to an embodiment.

FIG. 19 illustrates a SLIV approach 1900 indicating a DL forwarding location and corresponding beams, according to an embodiment. Specifically, FIG. 19 illustrates an example of using the SLIV based approach to indicate the time domain position of a PDCCH/PDSCH and their corresponding beams.

In FIG. 19, similar to FIG. 16, the DCI 1901 carrying the indication from the gNB to the repeater may have multiple fields carrying the SLIV values and their associated beam information, i.e., a one-to-one association between the time indication field and the beam indication field, that repeater should use to forward a PDCCH 1902/PDSCH 1903. To keep the DCI payload fixed, the number of SLIV fields and their corresponding beam indication field may be configured by higher layer signaling or may be predefined. Since some of the SLIVs may not be used each time, e.g., SLIV #3 1904, special values may be indicated to inform the repeater that the SLIV 1904 is unused while keeping the DCI payload size fixed. For example, all zeros may be used as a special value. Similarly, special values for the beam indication field can be reserved to indicate to the repeater that this field and its associated time indication field can be disregarded, such that all zeros can be used as a special value.

Instead of having an SLIV value field for each indicated beam, a single SLIV value may be indicated by a single slot offset, symbol offset and duration. In this case, the repeater may use the indicated start to be applied for the first indicated beam. The indicated duration may be assumed as the total duration for all the indicated beams and the duration for each beam may be derived according to a rule, e.g., it may be divided equally across the beams. For example, if the indicated duration is 25 symbols and 4 beams are indicated, then the first three indicated beams, e.g., indicated by the most significant bits, are applied for the duration of $\lfloor 25/4 \rfloor$ or $\lceil 25/4 \rceil$ symbols and the last indicated beam, e.g., indicated by the least significant bits, is applied for the remaining duration. Another possibility is that the repeater applies a single indicated duration to each indicated beam. Once the duration of each indicated beam is determined, the repeater may determine the start time position of the subsequent indicated beams such that they can be applied back-to-back.

The indication can also be carried by a MAC-CE or an RRC.

This embodiment can be equally applied to a CSI-RS in a P3 or P2 procedure.

Since the indication, from the gNB, to the repeater, may be in several procedures, e.g., for CSI-RSs in a P2 procedure, CSI-RSs in a P3 procedure and for a PDCCH/PDSCH indication, a purpose field may be used to indicate how the repeater is to interpret the indication.

Table 4 below shows an example for a purpose field for different procedures in which the purpose field is extended to include other purposes for forwarding PDCCH/PDSCH/PUCCH/PUSCH.

TABLE 4

| Purpose | Interpretation |
| --- | --- |
| 0 | The reference signals are for P2 procedure in beam management wherein the repeater freely select the beams for CSI-RSs belong to the same NZP-CSI-RS-ResourceSet with repetition off. |
| 1 | The reference signals are for P3 procedure in beam management wherein the repeater applies the same beam for all CSI-RSs belonging to the same NZP-CSI-RS-ResourceSet with repetition on. |
| 2 | Indicating that the repeater forwards PDCCH/PDSCH from the gNB to the UE(s) and applies the corresponding indicated beam |
| 3 | Indicating that the repeater forwards PUCCH/PUSCH from the UE(s) to the gNB and applies the corresponding indicated beam |

For indication carried by DCI, rather than having a purpose field, different RNTIs can be used. Specifically, the gNB may configure the repeater with different RNTIs, e.g., P1-RNTI, P2-RNTI, DL-CH-RNTI, and UL-CH-RNTI. In this case, the repeater may need to apply different scrambling IDs to determine how the indication should be interpreted.

Though having the indication carried in DCI is beneficial for dynamic scheduling, this may result in high signaling overhead and power consumption at the repeater. Therefore, an indication may be transmitted by higher layer signaling, e.g., a MAC-CE or an RRC, which may be beneficial for semi-persistent or periodic transmission. The solutions may be similar to the aforementioned procedures for CSI-RS for P2 and P3.

Additionally, the higher layer signaling such as RRC or MAC-CE may indicate multiple SLIVs with a particular period and their associated beams. This pattern may continuously repeat itself until it is deactivated or released. The periodicity may be the same as the periodicity of semi-persistent scheduling (SPS) PDSCH of an SS, a CSI-RS, etc.

When using a MAC-CE to carry the indication, from the gNB, to the repeater, the repeater may apply the provided indication after the repeater transmits a HARQ-Ack of the MAC-CE. For example, the indication may be applied in the first slot after slot $n+3N_{slot}^{subframe,\mu}$ where n is the slot for HARQ-Ack of MAC-CE.

In case of using an RRC, a particular offset at which the indicator is applied may be signaled through higher layer signaling or predefined, or according to some rules as in the case of MAC-CE.

Prioritization

In practice, the gNB may use multiple indication procedures (in DCI, in MAC-CE, or in RRC) to indicate, to the repeater, which symbols/slots are to be forwarded and which beam should be used. However, a conflict may occur for a set of symbols/slot. For example, if the gNB indicates, to the repeater, to use a particular beam on a set of symbols by higher layer signaling and then indicates to use another beam for the same set of symbols, the repeater's behavior may need to be defined to avoid causing confusion at the UE side. There may be a partial or full overlapping in the time domain between the indicated time duration for different beam indications. Such procedure may be beneficial to provide the gNB with enough flexibility and to retain the legacy functions in NR. For example, the gNB may want to cancel the configured DL transmission for a particular UE associated with a particular beam on the repeater-UE link and transmit higher priority transmission to another UE that needs a different beam.

For example, the indication carried by DCI may override the indication by a MAC-CE, which may override the indication by an RRC, i.e., in terms of priority, DCI>MAC-CE>RRC. When a conflict occurs, the repeater may apply the indication provided by the highest priority signaling (i.e., DCI, MAC-CE, or RRC). Also, the priority may be the opposite, i.e., RRC>MAC-CE>DCI, which is beneficial as RRC may be used for indicating cell-specific signals/channels.

Figure 20:
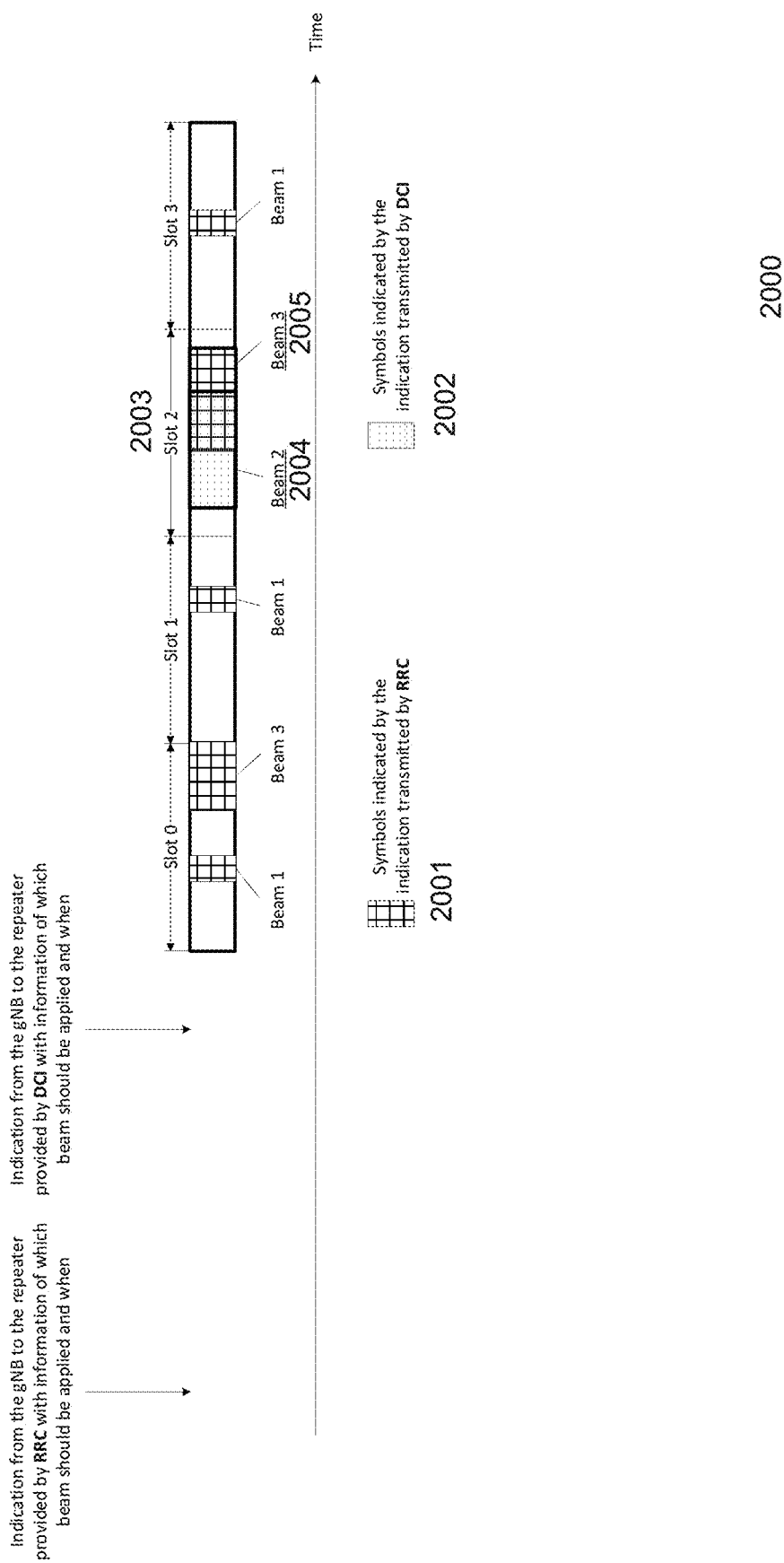
FIG. 20 illustrates handling of beam indication conflict at a repeater 2000, according to an embodiment.

FIG. 20 illustrates handling 2000 of a conflict between indications provided by an RRC and DCI, according to an embodiment. Specifically, in slot 2 2003, the set of symbols indicated by the RRC 2001 to be forwarded using beam 3 2005 partially overlaps with the set of symbols indicated by DCI 2002 to be forwarded using beam 2 2004. In this case, the repeater may apply beam 2 2004 based on the DCI indication and may not forward any symbol in the other set using beam 3 2005. Alternatively, only for the overlapped symbols, beam 2 2004 is used, but the repeater may still forward the remaining symbols using beam 3 2005.

The set of symbols may be defined as the symbols indicated by one SLIV value or by one bitmap.

A conflict may occur among different indicators provided by the same signaling (i.e., DCI, MAC-CE, or RRC) or different signaling. One possibility to address this issue is that repeater may apply the most recently received indication. Alternatively, a priority field may be included in the indication to indicate its associated priority. An additional field may for the priority may be included for indication using a PDCCH. This may be a single priority field indicating the priority for all beams indicated by the PDCCH or a separate priority field for each indicated beam. Similarly, for beam indication using MAC-CE or RRC, a single priority field indicating the priority for all beams indicated by MAC-CE or RRC, or a separate priority field for each indicated beam or tuple of beam and time indication may be used. For example, two priority levels may be included in the indication corresponding to low and high priority. In case of conflict, the repeater applies the indication with the highest priority.

To simplify the repeater implementation, a restriction may be imposed that no conflict is expected to occur among the indicators transmitted by the same signaling or different signaling.

Default Beam

The repeater may not receive an indication, from the gNB, indicating which beams should be applied on a set symbols/slots on the repeater-UE link. Therefore, it may be beneficial to define which beam the repeater should select for this set of symbols/slots.

For example, the gNB may explicitly indicate to the repeater which beam on the repeater-UE link should be used as the default beam. In this case, the gNB may rely on the mapping information provided, from the repeater, to the gNB, e.g., as illustrated in FIG. 11.

The gNB may indicate a set of multiple beams out of those indicated in the mapping information, from the repeater, to the gNB, as the default beam. In this case, the default beam may be constructed as the beam that covers the same spatial directions of all beams in the indicated set.

The default beam for forwarding the transmission on the repeater-UE link may be determined according to some rules. For example, the default beam may have the same spatial directions as the first m beams indicated in the mapping information from the repeater to the gNB as shown in FIG. 11. The value of m may be subject to the repeater capability may be reported from the repeater to the gNB as part of its capability signaling. Also, the repeater may indicate multiple m values and gNB may select one value.

Alternatively, the repeater may use the same beam used to forward an SSB. For example, if the repeater receives one SSB (or decides to forward one SSB on the repeater-UE link), the repeater applies the same beam for forwarding that SSB to the set of symbols/slots with no indication regarding the beam to be applied.

As another possibility, the default beam may be the last indicated beam.

Different solutions disclosed for indicating a CSI-RS or different channels can interchangeably be applied.

Repeater is Aware of the Configurations for its UEs

Similar for the case of a CSI-RS, when the repeater is aware of the configurations of its own UEs, the repeater may attempt to detect/decode the signals/channels that would be transmitted to the UE. The same procedures disclosed for a CSI-RS can be extended for different DL/UL channels.

If the gNB provides the repeater with lumped configurations of each UE to be served by the repeater, such as a PDSCH-Config for each UE, some modification may be needed for the configured TCI-State, such that the repeater becomes aware of which beam should be used to forward the transmission from the gNB to the UE.

For example, the repeater may interpret the RRC parameter referenceSignal relative to the actual beams that the repeater constructs on the repeater-UE link to forward the gNB's signals/channels to the UEs. To make the gNB aware of the actual beams constructed at the repeater, the aforementioned procedure in which the repeater transmits how some forwarded RSs are mapped to actual beams may be applied.

Beam Failure Recovery

As part of beam failure recovery, a UE should assess the quality of the serving beam and identify the candidate beam for recovery. To this end, multiple sets of periodic RSs can be configured to detect the beam failure and identify the candidate beam. In case of single transmission and reception point (TRP) operation, $\bar{q}_0$, and $\bar{q}_1$ are configured, respectively. In case of multiple TRP, $\{\{\bar{q}_{0,0}, \bar{q}_{0,1}\}$ and $\{\bar{q}_{1,0}, \bar{q}_{1,1}\}$ are configured, respectively.

Therefore, these RSs can be viewed as the CSI-RSs used for a P3 procedure from the aspect that the repeater should know when these RSs should be transmitted, and which beam should be applied. That is, the repeater cannot freely select the actual beam on the repeater-UE link, similar to the case of a CSI-RS used for a P2 procedure, as this may cause unnecessary triggering of a beam failure recovery procedure.

Therefore, the aforementioned procedures can be applied to inform the repeater when to transmit such a CSI-RS and which beam should be applied.

Beam for the gNB-Repeater Forwarding Link

The gNB-repeater link consists of two links, Link 1 (gNB-to-repeater-mobile-part) is between the gNB and mobile part of the repeater which may be considered as a typical UE connected to the gNB. This link is primarily used to enable the gNB to control the forwarding link. Link 2 (backhaul) is between the gNB and forwarding unit of the repeater and is used to receive or transmit the DL or UL transmission from the gNB or UE to be forwarded to the UE or gNB, respectively.

On Link 1, the legacy beam management techniques may be used to indicate to the mobile part of the repeater which beam should be used for the reception or transmission. An additional procedure may be needed for Link 2 to the repeater for determining which beam should be used for either transmission or reception. That is, for the communication on Link 1, there can be multiple beams used for different channels such as PDCCH and PDSCH and it is unclear which beam can be directly applied for Link 2.

One possibility is to exploit the beam configurations corresponding to Link 1 to indicate which beam should be used for the reception or transmission for Link 2. In this case, the same configured TCI state pool may be used for both links.

Out of this TCI pool, the gNB may (de)activate a subset of the TCI states for each link separately. A new MAC-CE may be used to indicate the (de)activated TCI states that may be used for indicating (de)activated beams for Link 2 (backhaul). Alternatively, the same MAC-CE may be used for (de)activating TCI states for both links.

To determine the applicable link, a 1-bit field in the MAC-CE may be used for this purpose. For example, if it is set to zero or one, then this MAC-CE (de)activates TCI states for Link 1 or Link 2, respectively. For example, in the "enhanced TCI states activation/deactivation for UE-specific PDSCH MAC-CE", there is one reserved bit that can be used for this purpose. Also, in "TCI States Activation/Deactivation for UE-specific PDSCH MAC CE" the number of configured TCI states by RRC should not be multiple integers of 8 such that there is at least 1-bit field left for which the applicable link.

The same concept may be extended when the RRC configures a separate TCI-state pools for Link 1 and Link 2. In this case, the aforementioned procedures may be applied to (de)activate a subset of TCI-states and indicating which pool of TCI-states is used.

In addition to indicating the beam that the repeater should use on Link 2, the repeater does not know for how long and when it should use this beam. Accordingly, the repeater may exploit the provided timing information for the forwarding on the repeater-UE link. That is, the Link 2 and the repeater-UE link may be coupled together. In this case, the time duration indicated for the repeater-UE link may be assumed the same time duration for the Link 2.

It is beneficial to have a collective indication of at least one of a time domain indication using any of the aforementioned procedures to indicate forwarding duration on Link 2 and the repeater-UE link, beam information for the repeater-UE link as described herein, which may include the actual TCI state, and the common properties between the beam used for forwarding the source RS such as QCL-type {A, B, C, D}, and beam information for Link 2 based on the beam configuration of the mobile part of the repeater as described herein.

Such collective information may be provided via RRC, MAC-CE or DCI as described herein.

Though the beam of Link 2 may be based beam configurations of the mobile part of the repeater, the gNB and repeater may use an approach similar to beam indication for the repeater-UE link. This may be beneficial when mobile part of the repeater is in different band than Link 2. In this case, the repeater and gNB may communicate to determine the actual beam used for receiving or transmission different reference signals on Link 2 and be used that to indicate what beam should be applied in the subsequent reception or transmission on Link 2.

Although it is described herein to provide collective information for Link 2 and the repeater-UE link, the information of Link 2 may be separately provided as well, which may provide more flexibility for the gNB to change the beam of different links.

Also, a default beam may be defined for the Link 2, similar to the default beams for repeater-UE link, which are used in case of the absence of an indication of which beam should be used. Additionally, on Link 2, the repeater may use the latest beam used for the transmission or reception by the mobile part of the repeater.

Throughout the disclosure, DCI is described as being used to carry different indications such as the applicable beam, the time duration for forwarding using that beam, etc.

A new DCI format is introduced for such purposes. In this case, the mobile part of the repeater may receive a new DCI format that carries side control information as described herein to define how the forwarding occurs in terms of time duration and applied beam. This DCI may be scrambled with particular RNTI similar C-RNTI.

If separate DCIs are used for carrying the control information of Link 2 and repeater-UE link, then each one may have a different RNTI, or a bit field with bit width of 2-bits can be used to indicate the applicable instruction is for at least one of Link 2 and the repeater-UE link.

Another possibility is to use the existing DCI format where in some of the existing fields are reinterpreted, reserved or ignored by the mobile part of the repeater. For example, TCI field may be used to indicate the beam that repeater should use to forward the transmission either on Link 2 or the repeater-UE link. Also, the time domain resource assignment field can be to indicate SLIV of the forwarding duration as described herein, or to be combined with other fields such as frequency hopping flag, MCS, NDI, or RV, to construct a bigger field indicating the time duration in form of a bitmap for the forwarding different transmissions. Other fields may be ignored.

For this approach to work, the repeater should know how to interpret the DCI, e.g., regular scheduling DCI to schedule PDSCH carrying MAC-CE, or DCI providing direct instruction on how the forwarding should be conducted. To this end, the gNB may configure separate search space/CORESETs such that no ambiguity exists and may indicate this by higher layer signaling, e.g. the RRC parameter. In this case, the PDCCH monitoring occasions (over regular scheduling DCI and DCI carrying direct instructions) may not overlap.

Solutions are disclosed, e.g., based on bitmap, SLIV, etc., for indicating the time domain for which forwarding takes place in either Link 2 or the repeater-UE link. To reduce the signaling overhead, some value may be preserved to indicate that the indicated beam may be applied until receiving other beam indication. However, no time domain indication may be needed when using a concept similar to a unified TCI framework. In this case, it may be sufficient to indicate the beam to be used on Link 2 and the repeater-UE link.

For example, if the mobile part of the repeater is configured to use unified TCI state framework, then the repeater may assume that the same indicated beam on Link 1 may be applied Link 2, at least for cells in the same band as the operating band of the mobile part of the repeater. In general, Link 1 may operate using unified TCI state framework while Link 2 requires indicating the time duration. Therefore, it may be beneficial for the gNB to explicitly indicate whether Link 2 uses a unified TCI state framework, e.g., via higher layer signaling, or implicitly indicating that by instructing the repeater to continue using the same beam on the repeater-UE link until receiving the next beam indication, e.g., reserving some value in the time indication field for this purpose.

If Link 2 uses unified TCI state framework, this does not necessarily mean that unified TCI state framework is automatically applied to the beams of the repeater-UE link. That is, some UEs served by the repeater may operate using legacy TCI framework. Even if all the UEs served by the repeater use unified TCI state framework, they are expected to be using different beams. Therefore, the gNB may explicitly indicate whether the unified TCI state framework should be applied on the repeater-UE link, e.g., via higher layer signaling. Alternatively, the gNB may implicitly indicate that by instructing the repeater to keep using the same beam on the repeater-UE link until receiving the next beam indication, e.g., reserving some value in the time indication field for this purpose.

As another possibility for indicating the applicable beam, the gNB and repeater may not need to exchange information about the actual beam or reference signal IDs. The gNB and repeater may determine particular time window that can be used to indicate which beam should be applied by the repeater. There may be two-time windows one for the repeater-UE link and another for Link 2. The determination of the window may include indicating its start and length that can be in the granularity of OFDM symbols, slots, subframes, frames, etc., or by indicating the index of first/last OFDM symbols, slots, subframes, frames, etc., in this window. The gNB may provide the configurations of such window by higher layer signaling such as RRC, MAC-CE or even dynamically by DCI.

Thereafter, this window is used for indicating which beam the repeater should use for forwarding the different transmissions on the repeater-UE link or Link 2. Specifically, for indicating a particular beam on the repeater-UE link, Link 2, or both, the gNB may indicate a particular time instance in this window. In this case, the repeater applies the same beam in this window, as the one used in the indicated time instance.

For indicating the time instance, a bitmap may be used, where each bit may be mapped to a single OFDM symbol, slot, subframe, frame, etc., within the time window, or even each bit may correspond to multiple OFDM symbols, slots, subframes, frames, etc., within the time window.

The time instance may also be provided to the repeater by indicating the index of the OFDM symbol, slot, subframe, radio frame, etc., within the time window.

Other solutions in this disclosure can be combined to have a complete framework. For example, the above-described methods for indicating the relation between the two beams (the one in the time window and the new one to be constructed by the repeater) such as the QCL type between both beams may be used as well. The above-described methods for indicating when and for how long the indicated beam are to be applied can be used as well.

Figure 2:
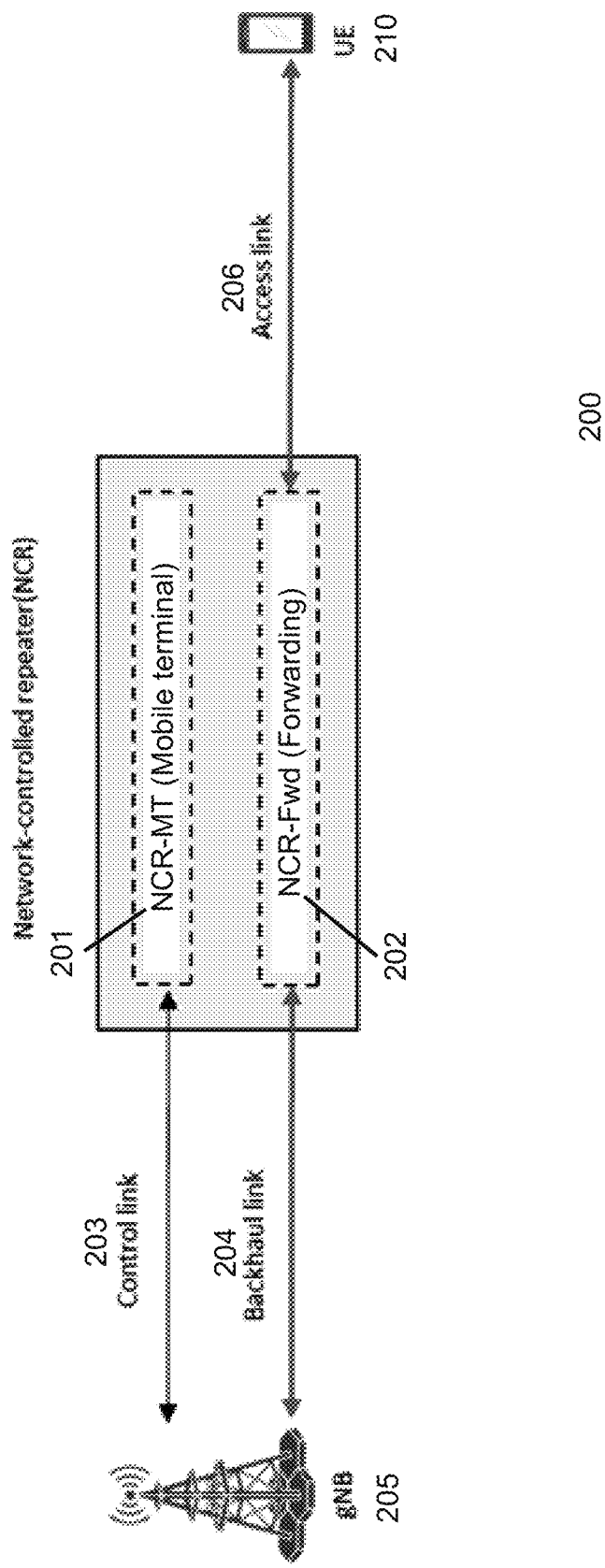
FIG. 2 illustrates a network-controlled repeater 200, to which the disclosure is applied.
Figure 21:
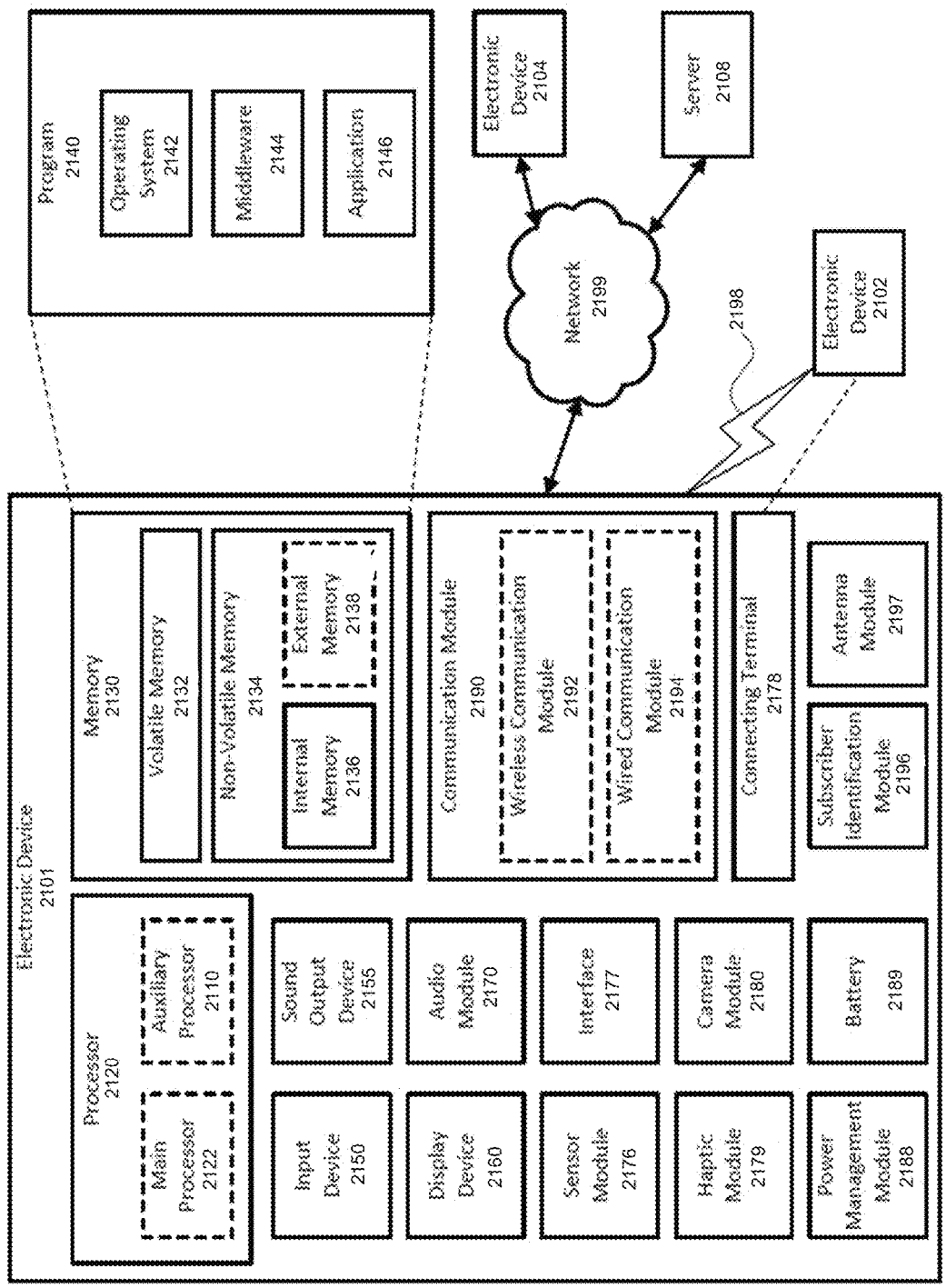
FIG. 21 is a block diagram of an electronic device in a network environment 2100, according to an embodiment.

FIG. 21 is a block diagram of an electronic device in a network environment 2100, according to an embodiment. Referring to FIG. 21, an electronic device 2101 in a network environment 2100 may communicate with an electronic device 2102 via a first network 2198 (e.g., a short-range wireless communication network), or an electronic device 2104 or a server 2108 via a second network 2199 (e.g., a long-range wireless communication network), and may also communicate with a repeater, such as the repeater 200 in FIG. 2 and as described throughout this Specification. The electronic device 2101 may communicate with the electronic device 2104 via the server 2108. The electronic device 2101 may include a processor 2120, a memory 2130, an input device 2140, a sound output device 2155, a display device 2160, an audio module 2170, a sensor module 2176, an interface 2177, a haptic module 2179, a camera module 2180, a power management module 2188, a battery 2189, a communication module 2190, a subscriber identification module (SIM) card 2196, or an antenna module 2194. In one embodiment, at least one (e.g., the display device 2160 or the camera module 2180) of the components may be omitted from the electronic device 2101, or one or more other components may be added to the electronic device 2101. Some of the components may be implemented as a single integrated circuit (IC). For example, the sensor module 2176 (e.g., a fingerprint sensor, an iris sensor, or an illuminance sensor) may be embedded in the display device 2160 (e.g., a display).

The processor 2120 may execute, for example, software (e.g., a program 2140) to control at least one other component (e.g., a hardware or a software component) of the electronic device 2101 coupled with the processor 2120 and may perform various data processing or computations. As at least part of the data processing or computations, the processor 2120 may load a command or data received from another component (e.g., the sensor module 2146 or the communication module 2190) in volatile memory 2132, process the command or the data stored in the volatile memory 2132, and store resulting data in non-volatile memory 2134. The processor 2120 may include a main processor 2121 (e.g., a central processing unit (CPU) or an application processor (AP)), and an auxiliary processor 2123 (e.g., a graphics processing unit (GPU), an image signal processor (ISP), a sensor hub processor, or a communication processor (CP)) that is operable independently from, or in conjunction with, the main processor 2121. Additionally or alternatively, the auxiliary processor 2123 may be adapted to consume less power than the main processor 2121, or execute a particular function. The auxiliary processor 2123 may be implemented as being separate from, or a part of, the main processor 2121.

The auxiliary processor 2123 may control at least some of the functions or states related to at least one component (e.g., the display device 2160, the sensor module 2176, or the communication module 2190) among the components of the electronic device 2101, instead of the main processor processor 2121 while the main processor 2121 is in an inactive (e.g., sleep) state, or together with the main processor 2121 while the main processor 2121 is in an active state (e.g., executing an application). The auxiliary processor 2123 (e.g., an image signal processor or a communication processor) may be implemented as part of another component (e.g., the camera module 2180 or the communication module 2190) functionally related to the auxiliary processor 2123.

The memory 2130 may store various data used by at least one component (e.g., the processor 2120 or the sensor module 2176) of the electronic device 2101. The various data may include, for example, software (e.g., the program 2140) and input data or output data for a command related thereto. The memory 2130 may include the volatile memory 2132 or the non-volatile memory 2134.

The program 2140 may be stored in the memory 2130 as software, and may include, for example, an operating system (OS) 2142, middleware 2144, or an application 2146.

The input device 2150 may receive a command or data to be used by another component (e.g., the processor 2120) of the electronic device 2101, from the outside (e.g., a user) of the electronic device 2101. The input device 2150 may include, for example, a microphone, a mouse, or a keyboard.

The sound output device 2155 may output sound signals to the outside of the electronic device 2101. The sound output device 2155 may include, for example, a speaker or a receiver. The speaker may be used for general purposes, such as playing multimedia or recording, and the receiver may be used for receiving an incoming call. The receiver may be implemented as being separate from, or a part of, the speaker.

The display device 2160 may visually provide information to the outside (e.g., a user) of the electronic device 2101. The display device 2160 may include, for example, a display, a hologram device, or a projector and control circuitry to control a corresponding one of the display, hologram device, and projector. The display device 2160 may include touch circuitry adapted to detect a touch, or sensor circuitry (e.g., a pressure sensor) adapted to measure the intensity of force incurred by the touch.

The audio module 2170 may convert a sound into an electrical signal and vice versa. The audio module 2170 may obtain the sound via the input device 2150 or output the sound via the sound output device 2155 or a headphone of an external electronic device 2102 directly (e.g., wired) or wirelessly coupled with the electronic device 2101.

The sensor module 2176 may detect an operational state (e.g., power or temperature) of the electronic device 2101 or an environmental state (e.g., a state of a user) external to the electronic device 2101, and then generate an electrical signal or data value corresponding to the detected state. The sensor module 2176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 2177 may support one or more specified protocols to be used for the electronic device 2101 to be coupled with the external electronic device 2102 directly (e.g., wired) or wirelessly. The interface 2177 may include, for example, a high-definition multimedia interface (HDMI), a universal serial bus (USB) interface, a secure digital (SD) card interface, or an audio interface.

A connecting terminal 2178 may include a connector via which the electronic device 2101 may be physically connected with the external electronic device 2102. The connecting terminal 2178 may include, for example, an HDMI connector, a USB connector, an SD card connector, or an audio connector (e.g., a headphone connector).

The haptic module 2179 may convert an electrical signal into a mechanical stimulus (e.g., a vibration or a movement)

or an electrical stimulus which may be recognized by a user via tactile sensation or kinesthetic sensation. The haptic module 2179 may include, for example, a motor, a piezoelectric element, or an electrical stimulator.

The camera module 2180 may capture a still image or moving images. The camera module 2180 may include one or more lenses, image sensors, image signal processors, or flashes.

The power management module 2188 may manage power supplied to the electronic device 2101. The power management module 2188 may be implemented as at least part of, for example, a power management integrated circuit (PMIC).

The battery 2189 may supply power to at least one component of the electronic device 2101. The battery 2189 may include, for example, a primary cell which is not rechargeable, a secondary cell which is rechargeable, or a fuel cell.

The communication module 2190 may support establishing a direct (e.g., wired) communication channel or a wireless communication channel between the electronic device 2101 and the external electronic device (e.g., the electronic device 2102, the electronic device 2104, or the server 2108) and performing communication via the established communication channel. The communication module 2190 may include one or more communication processors that are operable independently from the processor 2120 (e.g., the AP) and supports a direct (e.g., wired) communication or a wireless communication. The communication module 2190 may include a wireless communication module 2192 (e.g., a cellular communication module, a short-range wireless communication module, or a global navigation satellite system (GNSS) communication module) or a wired communication module 2194 (e.g., a local area network (LAN) communication module or a power line communication (PLC) module). A corresponding one of these communication modules may communicate with the external electronic device via the first network 2198 (e.g., a short-range communication network, such as Bluetooth, wireless-fidelity (Wi-Fi) direct, or a standard of the Infrared Data Association (IrDA)) or the second network 2199 (e.g., a long-range communication network, such as a cellular network, the Internet, or a computer network (e.g., LAN or wide area network (WAN)). These various types of communication modules may be implemented as a single component (e.g., a single IC), or may be implemented as multiple components (e.g., multiple ICs) that are separate from each other. The wireless communication module 2192 may identify and authenticate the electronic device 2101 in a communication network, such as the first network 2198 or the second network 2199, using subscriber information (e.g., international mobile subscriber identity (IMSI)) stored in the subscriber identification module 2196.

The antenna module 2197 may transmit or receive a signal or power to or from the outside (e.g., the external electronic device) of the electronic device 2101. The antenna module 2197 may include one or more antennas, and, therefrom, at least one antenna appropriate for a communication scheme used in the communication network, such as the first network 2198 or the second network 2199, may be selected, for example, by the communication module 2190 (e.g., the wireless communication module 2192). The signal or the power may then be transmitted or received between the communication module 2190 and the external electronic device via the selected at least one antenna.

Commands or data may be transmitted or received between the electronic device 2101 and the external electronic device 2104 via the server 2108 coupled with the second network 2199. Each of the electronic devices 2102 and 2104 may be a device of a same type as, or a different type, from the electronic device 2101. All or some of operations to be executed at the electronic device 2101 may be executed at one or more of the external electronic devices 2102, 2104, or 2108. For example, if the electronic device 2101 should perform a function or a service automatically, or in response to a request from a user or another device, the electronic device 2101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request and transfer an outcome of the performing to the electronic device 2101. The electronic device 2101 may provide the outcome, with or without further processing of the outcome, as at least part of a reply to the request. To that end, a cloud computing, distributed computing, or client-server computing technology may be used, for example.

While the present disclosure has been described with reference to certain embodiments, various changes may be made without departing from the spirit and the scope of the disclosure, which is defined, not by the detailed description and embodiments, but by the appended claims and their equivalents.

What is claimed is:

1. A method comprising:
   receiving, at a repeater, from a base station, a set of resources with repetition off, over a same beam;
   receiving, at the repeater, from the base station, an indication of beam indices and at least one time to apply beams indicated by the beam indices; and
   transmitting, from the repeater, to a user equipment, each resource from the set of resources using a respective one of the beams.

2. The method of claim 1,
   wherein the at least one time to apply the beams is signaled by a duration, slot offsets, and symbol offsets.

3. The method of claim 2,
   wherein the indication of beam indices is received by the repeater via higher layer signaling, wherein the higher layer signaling indicates a periodicity for the indication of beam indices.

4. The method of claim 3, further comprising:
   repeating transmission of the indication of beam indices when the higher layer signaling is radio resource control (RRC) signaling or a medium access control-control element (MAC-CE) across an indicated period.

5. The method of claim 2, wherein the indication of beam indices is received by the repeater via downlink control information (DCI).

6. The method of claim 5,
   wherein the DCI comprises fields, and each of the fields is dedicated to a respective one of the beams.

7. The method of claim 5,
   wherein the DCI comprises at least one field dedicated to the time to apply the beams.

8. The method of claim 7,
   wherein the DCI comprises a plurality of beam indication fields and a plurality of time indication fields, and each beam indication field is associated with a respective time indication field.

9. The method of claim 5,
wherein the indication of beam indices is transmitted to the repeater by a first radio network temporary identifier (RNTI) applied to the DCI that is different from a second RNTI used for receiving other configurations.

10. The method of claim 5, further comprising:
prioritizing beam indication by the DCI over semi-static beam indication by radio resource control (RRC) signaling when the beam indication by the DCI collides with the semi-static beam indication by the RRC signaling.

* * * * *